(12) United States Patent  
Kim

(10) Patent No.: US 9,794,683 B2  
(45) Date of Patent: Oct. 17, 2017

(54) ELECTRONIC DEVICE AND METHOD FOR CONTROLLING THE SAME

(71) Applicant: LG ELECTRONICS INC., Seoul (KR)

(72) Inventor: Yongtae Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/817,782

(22) Filed: Aug. 4, 2015

(65) Prior Publication Data

US 2016/0050487 A1 Feb. 18, 2016

(30) Foreign Application Priority Data

Aug. 13, 2014 (KR) .......................... 10-2014-0105265

(51) Int. Cl.
*H04R 1/10* (2006.01)
*H04R 1/32* (2006.01)
(Continued)

(52) U.S. Cl.
CPC ............. *H04R 1/323* (2013.01); *G06F 3/016* (2013.01); *H04R 1/1041* (2013.01); *H04R 1/32* (2013.01);
(Continued)

(58) Field of Classification Search
CPC .. H04R 2420/07; H04R 1/406; H04R 29/008; H04R 3/005; H04R 1/025; H04R 1/026; H04R 1/028; H04R 1/08; H04R 2227/003; H04R 2307/023; H04R 2307/025; H04R 2307/029; H04R 2430/01; H04R 2430/23; H04R 25/554; H04W 4/02; H04W 4/028; H04W 4/14; H04W 4/22; H04W 52/0209; H04W 52/025; H04W 12/12; H04W 4/008; H04W 52/0245; H04W 52/0261; H04W 68/00; H04W 84/10; H04W 88/02; G10H 2220/241; G10H 2220/391; G10H 2220/395; G10H 2230/005;
(Continued)

(56) References Cited

U.S. PATENT DOCUMENTS 5,757,929 A    5/1998 Wang et al.
6,130,953 A *  10/2000 Wilton .................... H04M 1/05
                                            379/430
(Continued)

FOREIGN PATENT DOCUMENTS

CN    203233523 U    10/2013
CN    104254036 A    12/2014
(Continued)

*Primary Examiner* — Lun-See Lao
(74) *Attorney, Agent, or Firm* — Dentons US LLP

(57) ABSTRACT

An electronic device of the present invention includes: a first body having an arch shape corresponding to the neck of a user so as to be worn around the neck of the user; second bodies respectively attached to both ends of the first body and including one or more joints by which the second bodies move relative to the first body; and a directional speaker provided to at least part of the second bodies to output sound in a specific direction. According to the present invention, a directional speaker is provided to a wearable device that can be worn around the neck of the user so as to effectively transmit sound to the user.

11 Claims, 32 Drawing Sheets

(51) Int. Cl.
*G06F 3/01* (2006.01)
*H04R 5/033* (2006.01)
*H04R 5/02* (2006.01)

(52) U.S. Cl.
CPC ............... *H04R 5/02* (2013.01); *H04R 5/033* (2013.01); *H04R 2201/107* (2013.01); *H04R 2430/01* (2013.01); *H04R 2499/11* (2013.01); *H04R 2499/15* (2013.01)

(58) Field of Classification Search
CPC ....... G10H 2230/015; G10H 2230/075; G10H 2230/0365; G10H 3/125
USPC .................. 381/74, 385, 370, 151; 379/430; 704/275
See application file for complete search history.

(56) References Cited

U.S. PATENT DOCUMENTS

| | | | |
|---|---|---|---|
| 2010/0158287 A1 | 6/2010 | Xu et al. | |
| 2013/0066636 A1* | 3/2013 | Singhal | H04R 1/32 |
| | | | 704/275 |
| 2013/0114825 A1* | 5/2013 | Andreasen | H04R 5/0335 |
| | | | 381/74 |
| 2015/0010172 A1* | 1/2015 | Chen | H04R 1/14 |
| | | | 381/151 |
| 2015/0196101 A1* | 7/2015 | Dayal | A44C 15/005 |
| | | | 63/1.11 |

FOREIGN PATENT DOCUMENTS

| | | | | |
|---|---|---|---|---|
| EP | 2590428 A2 | 5/2013 | | |
| FR | 3012007 A1 | 4/2015 | | |
| JP | 2008529126 A | 7/2008 | | |
| JP | 2009201088 A | 9/2009 | | |
| JP | 2010-226244 A | 10/2010 | | |
| JP | 2013-191996 | * | 9/2013 | ............... H04R 3/00 |
| JP | 2013191996 A | 9/2013 | | |
| KR | 1020060051367 A | 5/2006 | | |
| KR | 1020090083159 A | 8/2009 | | |
| KR | 101295046 B1 | 8/2013 | | |
| KR | 1020140064590 A | 5/2014 | | |
| KR | 101471084 B1 | 12/2014 | | |
| WO | 9534184 A1 | 12/1995 | | |

\* cited by examiner

FIG. 3
(a) 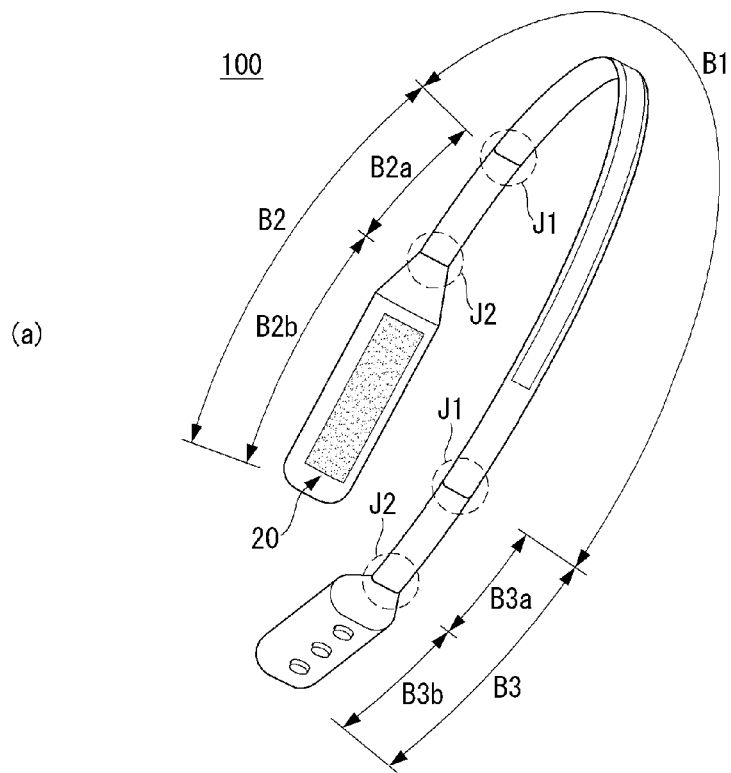
(b) 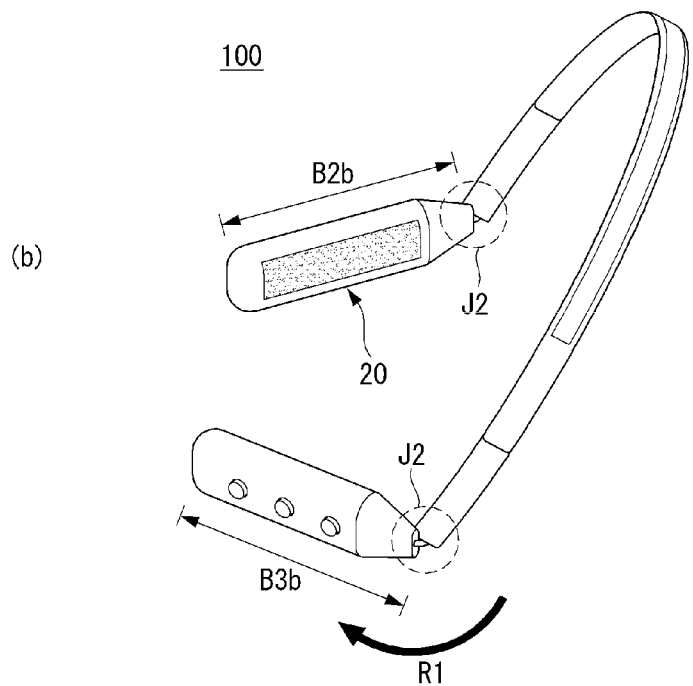

FIG. 6
(a)
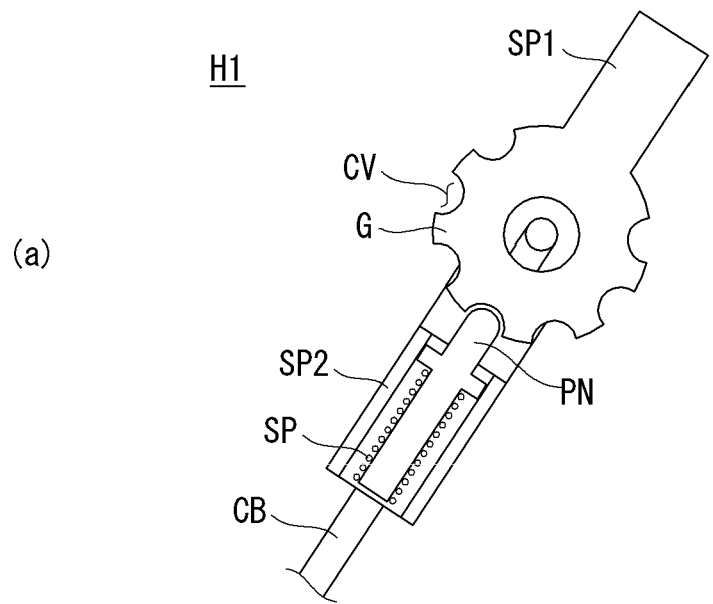
(b)
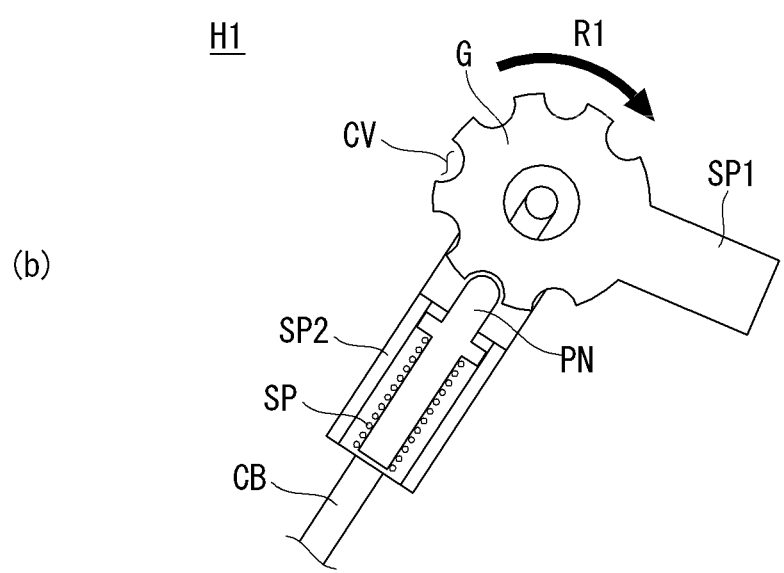

FIG. 7
(a)
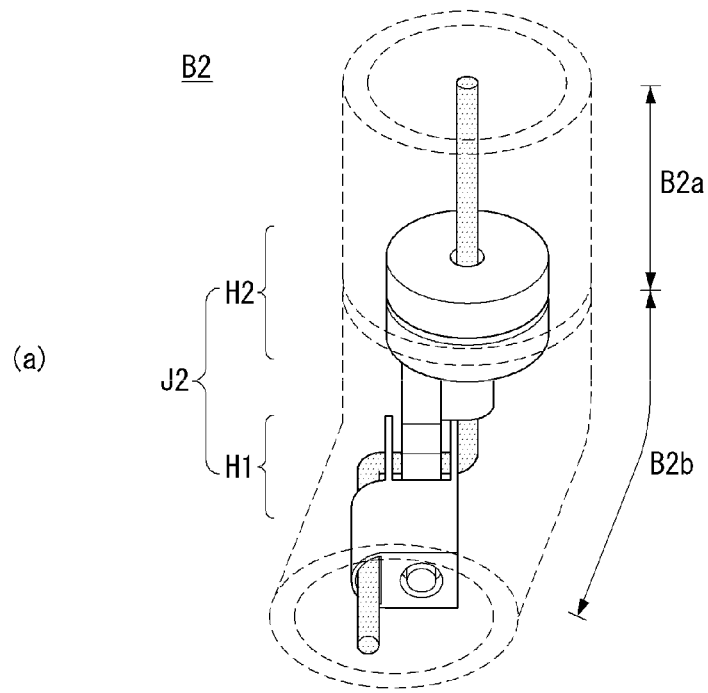
(b)
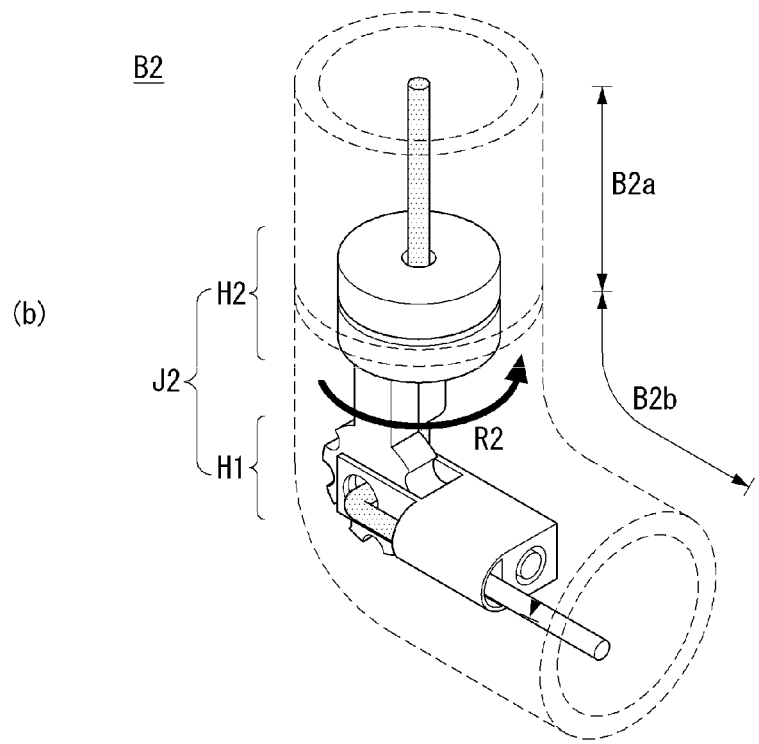

FIG. 8
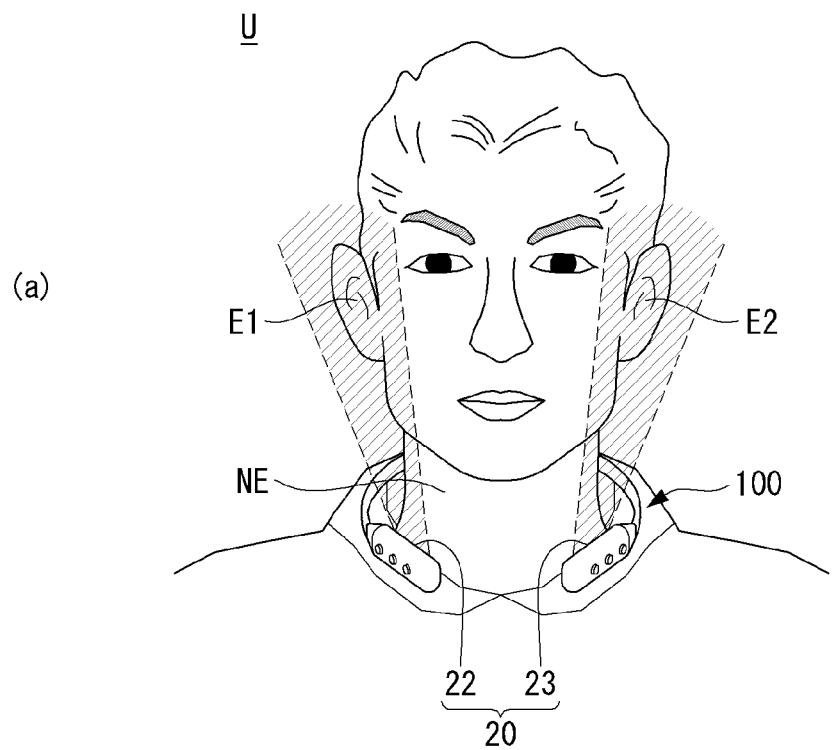
(a)
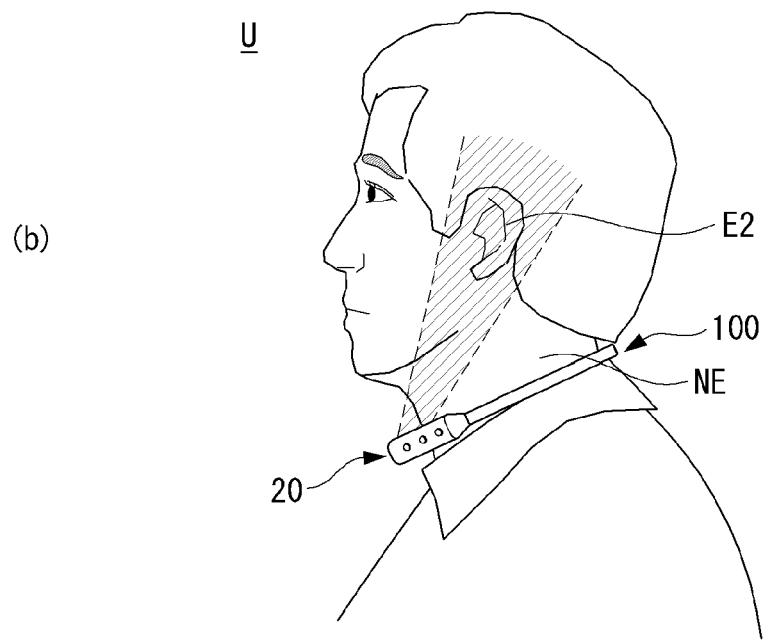
(b)

FIG. 9
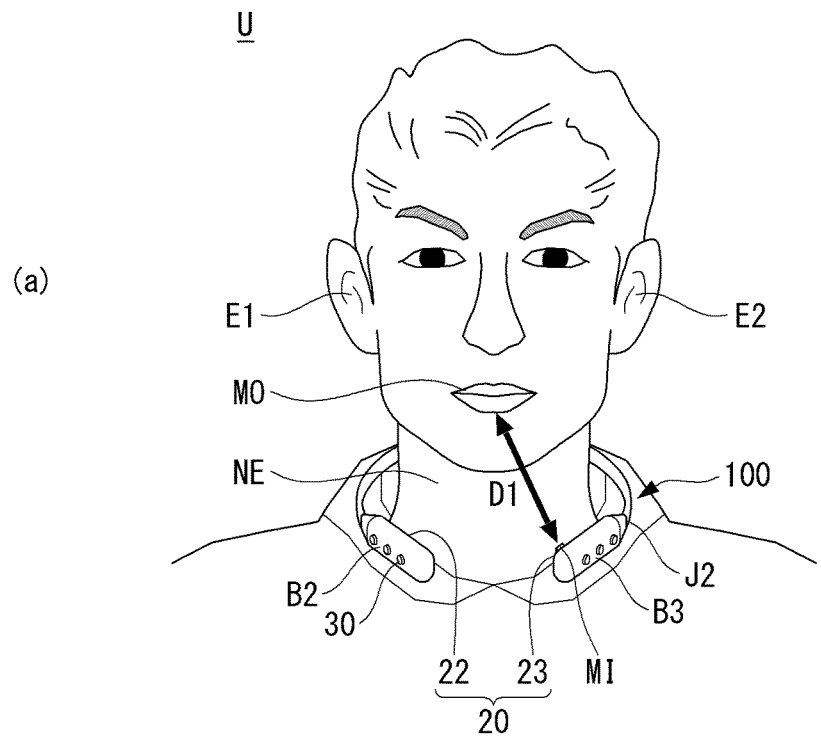
(a)
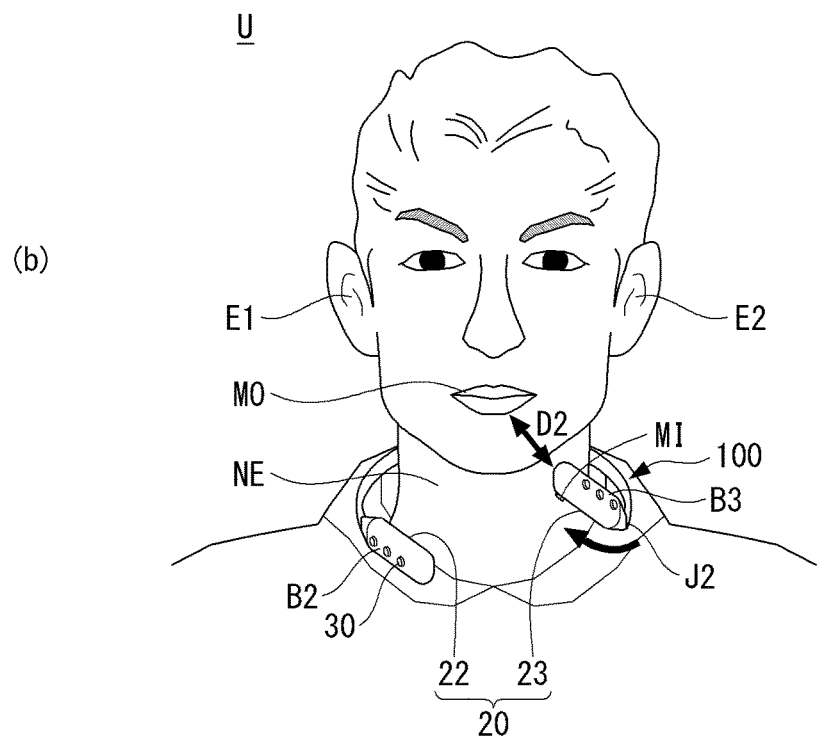
(b)

FIG. 13
(a)
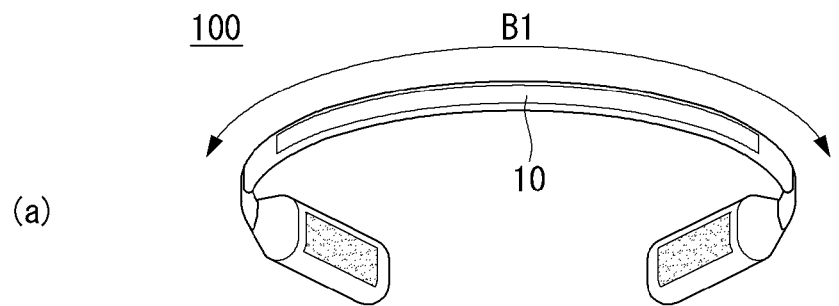
(b)
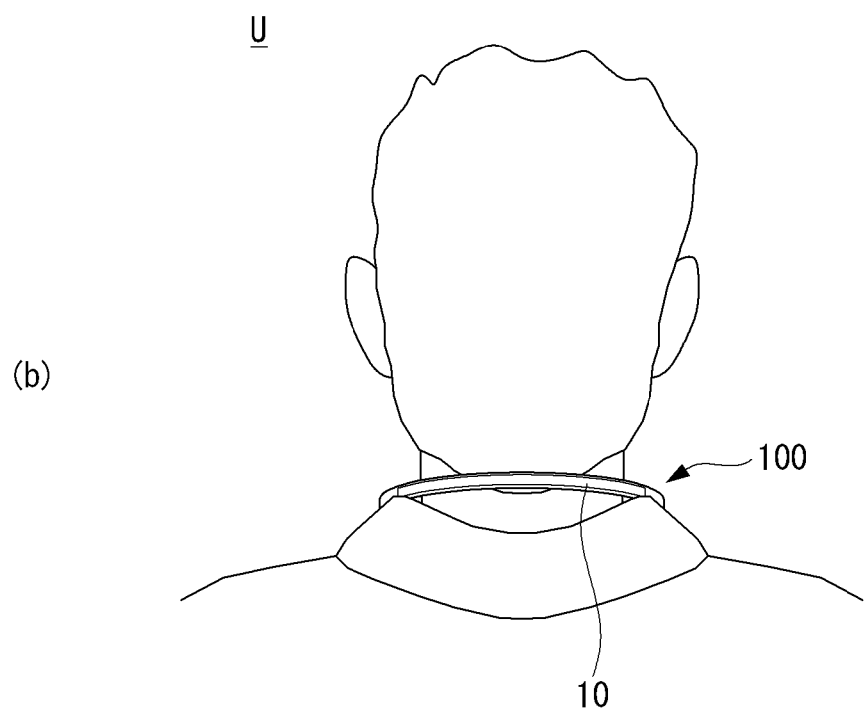

FIG. 21
(a) 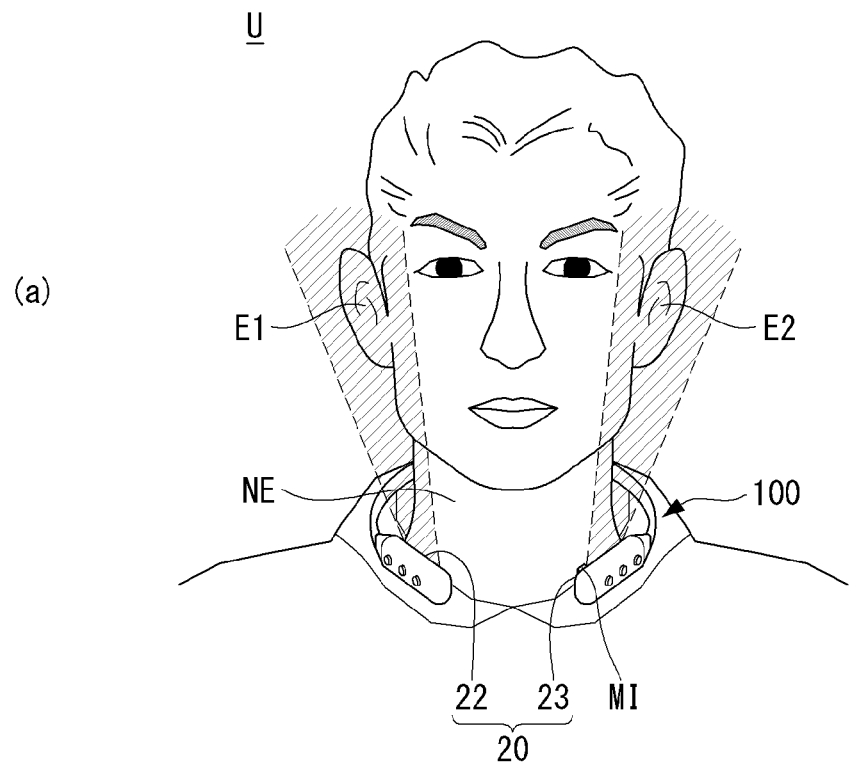
(b) 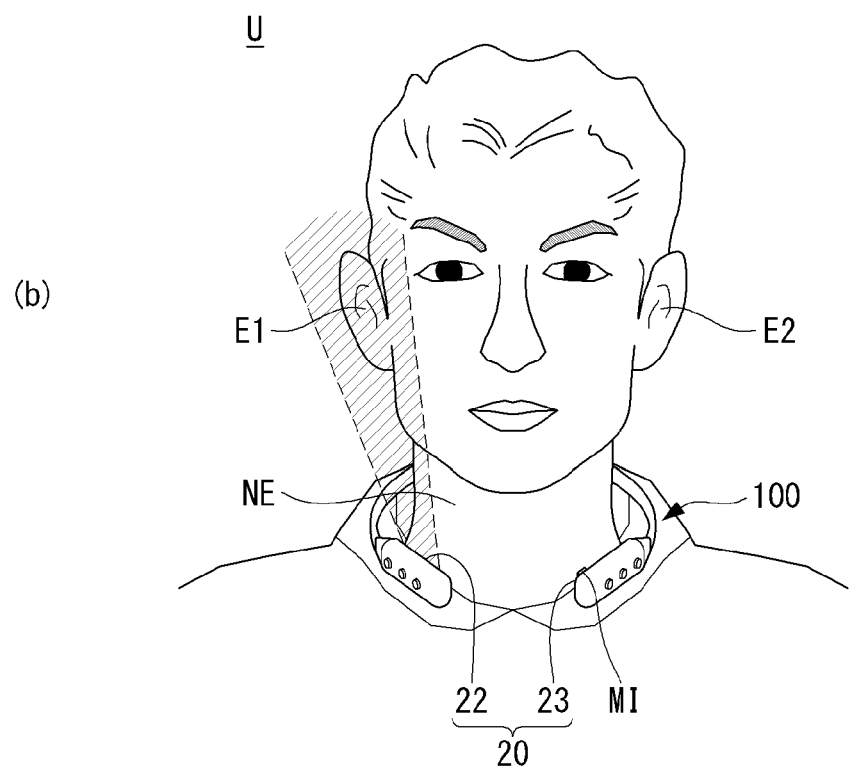

FIG. 27
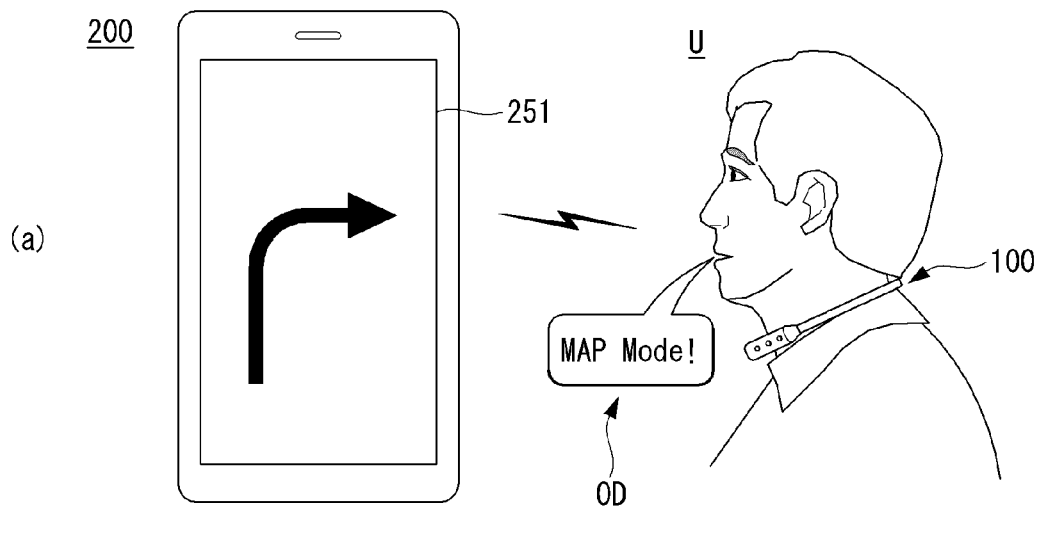
(a)
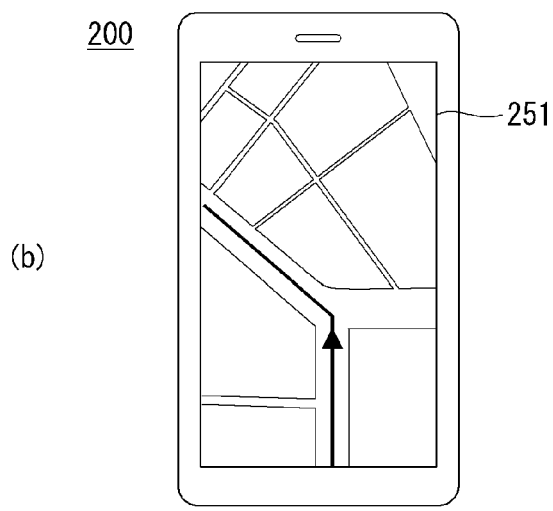
(b)

FIG. 30
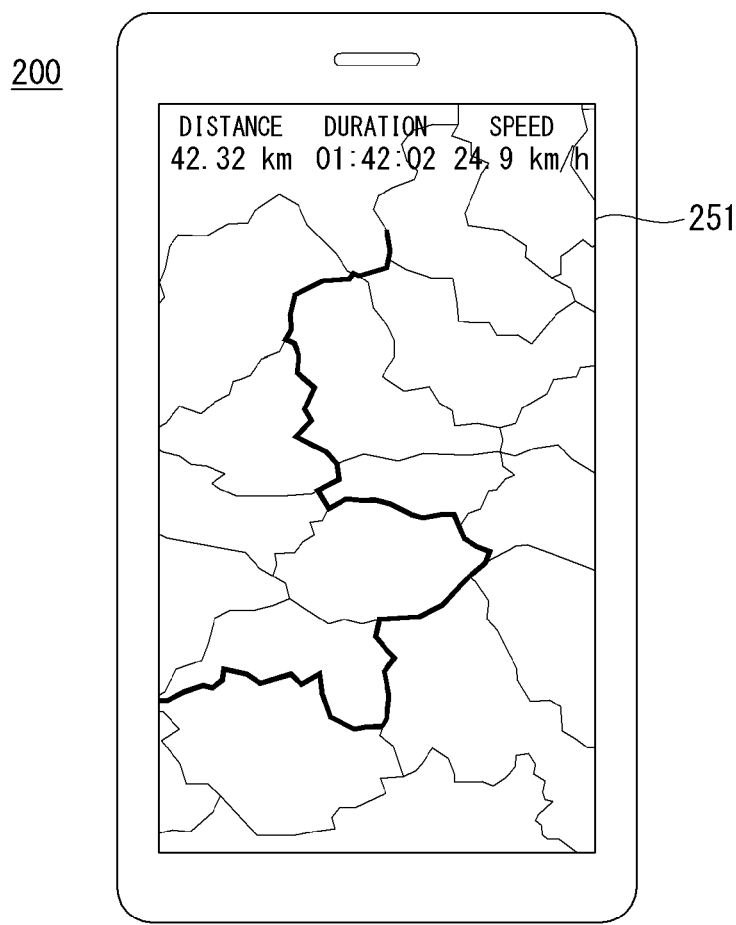
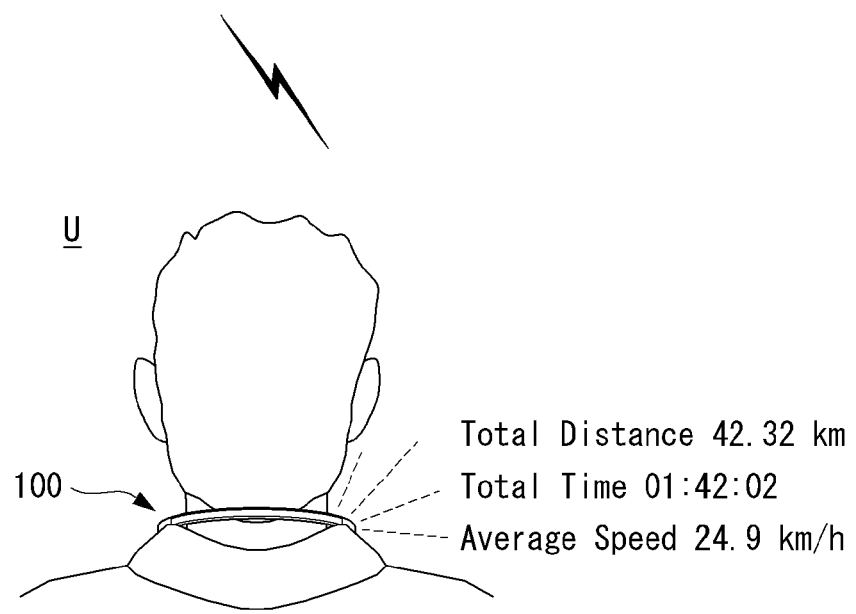

FIG. 31
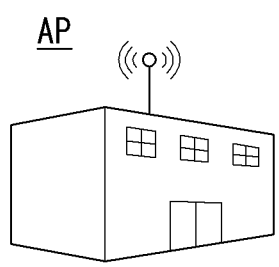
AP
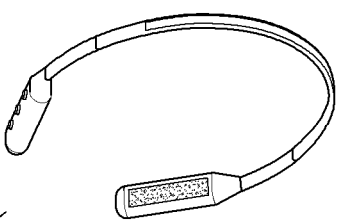
100
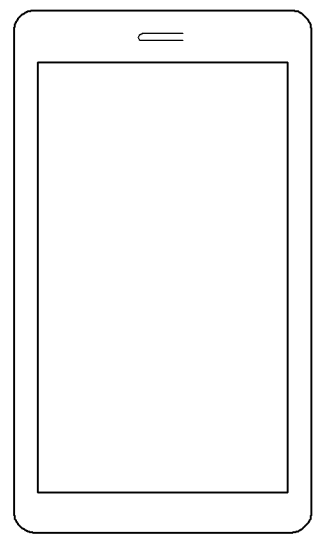
200

FIG. 32
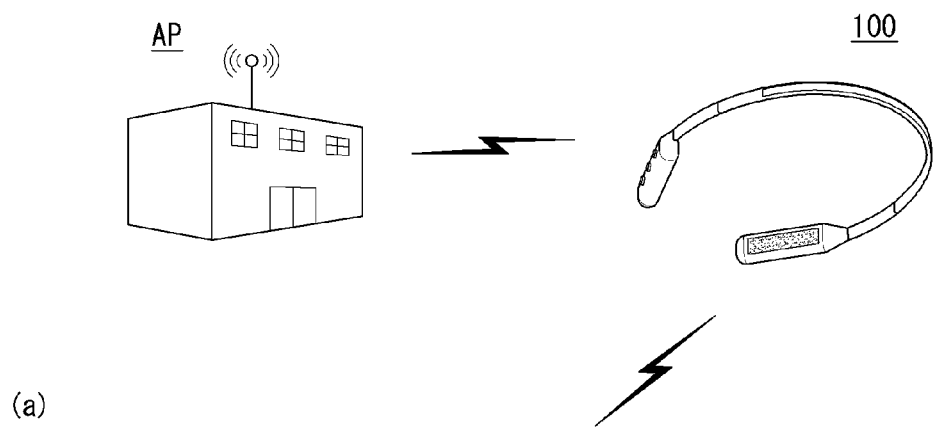
(a)
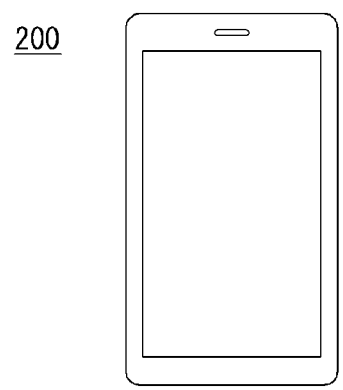
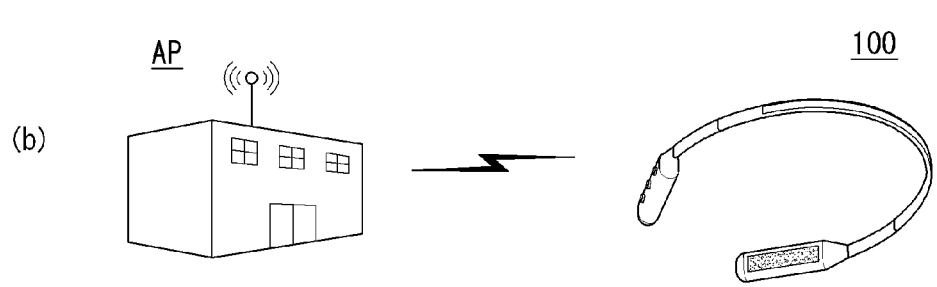
(b)

ELECTRONIC DEVICE AND METHOD FOR CONTROLLING THE SAME

CROSS-REFERENCE TO RELATED APPLICATION

Pursuant to 35 U.S.C. §119(a), this application claims the benefit of earlier filing date and right of priority to Korean Patent Application No. 10-2014-0105265, filed on Aug. 13, 2014, the contents of which are incorporated by reference herein in their entirety.

BACKGROUND OF THE INVENTION

Technical Field

The present invention relates to an electronic device configured as a wearable device that can be worn around a user's neck and includes a directional speaker so as to effectively transmit sound to the user, and a method for controlling the same.

Discussion of the Related Art

Electronic devices can be categorized as mobile/portable terminals and stationary terminals according to whether the electronic devices have mobility. The mobile terminals can be further classified into handheld terminals and vehicle mounted terminals according to whether users can personally carry the terminals.

Functions of a mobile terminal are diversified. For example, the mobile terminal functions include data and audio communication, photographing and videotaping using cameras, audio recording, music file reproduction through a speaker system, and display of images or video on a display unit. Some terminals have electronic game play functions or execute a multimedia player function. Particularly, recent mobile terminals can receive multicast signals that provide visual content such as broadcast, video and television programming.

Such terminal is implemented as a multimedia player having complex functions such as photographing of pictures or video, reproduction of music or video files, gaming, and broadcast reception as the functions thereof are diversified.

To support and enhance the functions of such terminal, improving a structural part and/or a software part of the terminal would be desirable.

Recently, an electronic device has been implemented in the form of a wearable device that a user can wear. Development of wearable devices in various forms is attempted and configurations and/or UIs optimized for wearable devices in various forms are studied.

SUMMARY OF THE INVENTION

An object of the present invention is to solve the aforementioned problem and other problems. Another object of the present invention is to provide an electronic device configured as a wearable device that can be worn around a user's neck and includes a directional speaker so as to effectively transmit sound to the user, and a method for controlling the same.

According to one aspect of the present invention to accomplish the above or other objects, an electronic device includes: a first body having an arch shape corresponding to the neck of a user so as to be worn around the neck of the user; second bodies respectively attached to both ends of the first body and including one or more joints by which the second bodies move relative to the first body; and a directional speaker provided to at least part of the second bodies to output sound in a specific direction.

According to another aspect of the present invention, a method for controlling an electronic device includes: setting an operation mode of the electronic device including: a first body having an arch shape corresponding to the neck of a user so as to be worn around the neck of the user; second bodies respectively attached to both ends of the first body and including one or more joints by which the second bodies move relative to the first body; and a directional speaker provided to at least part of the second bodies to output sound in a specific direction; and changing operations of the electronic device including operation of the directional speaker according to the set operation mode.

The mobile terminal and the method for controlling the same according to the present invention have the following advantages.

According to at least one embodiment of the present invention, it is possible to effectively deliver sound to a user using a directional speaker provided to a wearable device that can be worn around the neck of the user.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

FIGS. 1 to 4 illustrate an electronic device according to one embodiment of the present invention.

FIGS. 5 to 7 illustrate the structure of the electronic device shown in FIG. 1.

FIGS. 8 and 9 show states in which a user wears the electronic device shown in FIG. 1.

FIGS. 13 to 17 illustrate operation in the bicycle mode of FIG. 12.

FIG. 21 illustrates operation in the telephone mode of FIG. 20.

FIGS. 25 to 30 illustrate operations of the electronic device shown in FIG. 1 and a mobile terminal.

FIGS. 31 and 32 illustrate communication methods of the electronic device shown in FIG. 1.

DETAILED DESCRIPTION

Figure 1:
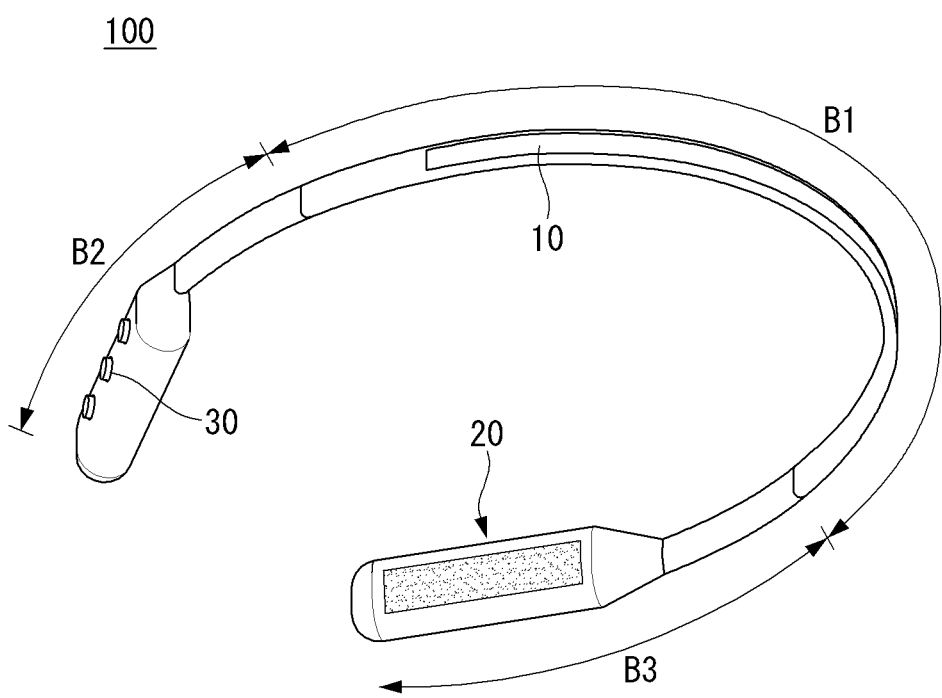

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Electronic devices presented herein may be implemented using a variety of different types of terminals. Examples of such terminals include cellular phones, smart phones, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of electronic devices. However, such teachings apply equally to other types of terminals, such as those types noted above. In addition, these teachings may also be applied to stationary terminals such as digital TV, desktop computers, digital signage, and the like.

Electronic devices can be extended to wearable devices from handheld devices. Such wearable devices include smart watches, smart glasses, head mounted displays (HMDs) and the like. A description will be given of examples of electronic devices extended to wearable devices.

A wearable device may be configured to exchange data (or to operate in connection) with another electronic device 100. A short-range communication module 114 of the electronic device 100 may sense (or recognize) a wearable device, which can communicate with the electronic device 100, around the electronic device 100. A controller 180 of the electronic device 100 may transmit at least part of data processed in the electronic device 100 to the sensed wearable device through the short-range communication module 114 when the sensed wearable device is a device authenticated to communicate with the electronic device 100. Accordingly, a user can use the data processed in the electronic device 100 through the wearable device. For example, when a call is received through the electronic device 100, the user can take the telephone call through the wearable device. When the electronic device 100 receives a message, the user can check the received message through the wearable device.

A description will be given of a control method and related embodiments that can be implemented in the electronic device configured as above with reference to the attached drawings. Those skilled in the art will appreciate that the present invention may be carried out in other specific ways than those set forth herein without departing from the spirit and essential characteristics of the present invention.

FIGS. 1 to 4 illustrate an electronic device 100 according to an embodiment of the present invention.

As shown, the electronic device 100 according to an embodiment of the present invention may include a first body B1 and second bodies B2 and B3 and be worn around the neck of a user.

FIG. 1 shows the appearance of the electronic device 100 according to an embodiment of the present invention.

The first body B1 may be configured in the form of an arc corresponding to the shape of the neck of the user such that the first body B1 is worn around the neck of the user. For example, the first body B1 can be configured in the form of a semicircle such that the first body B1 can be attached to the back of the neck of the user.

The first body B1 may be formed of an elastic material. For example, the first body B1 can be formed of a material having elasticity within a predetermined range such as a plastic material. Accordingly, the first body B1 can be naturally deformed when the electronic device 100 is worn around the neck of the user. The first body B1 may include a display 10.

The display 10 may be positioned at the back of the first body B1. That is, the display 10 may be disposed at the part of the first body B1, which corresponds to the back of the neck of the user. Accordingly, when the user wears the electronic device 100, other users who are located behind the user can see a color displayed on the display 10.

The display 10 may be configured to emit light in a specific color. For example, the display 10 can be configured to flash a red light at predetermined intervals. The display 10 may be configured to emit lights in multiple colors. For example, the display 10 can emit red light and blue light. The display 10 may include a plurality of areas. For example, the display 10 can be divided into left and right areas and/or upper and lower areas. Accordingly, only the left area can emit light or the left and right areas can respectively emit different colors. That is, the plurality of areas can independently operate.

The second bodies B2 and B3 may be attached to both ends of the first body B1. When the outer material of the second bodies B2 and B3 is identical/similar to that of the first body B1, the second bodies B2 and B3 can be seen as being extended from the first body B1.

The second bodies B2 and B3 may be attached to the first body B1 such that the second bodies B2 and B3 move relative to the first body. For example, the second bodies B2 and B3 can be rotated and/or bent with respect to the first body B1 through one or more hinges. Accordingly, the user can change the shape of the second bodies B2 and B3 into a form that can be conveniently used while wearing the electronic device 100. In addition, the electronic device 100 can be used for various purposes by changing the shape of the second bodies B2 and B3 irrespective of whether the user wears the electronic device 100. The second bodies B2 and B3 may include a directional speaker 20 and manipulation buttons 30.

The directional speaker 20 may be provided to the second bodies B2 and B3 so as to output sound. The directional speaker 20 can output sound in a specific direction, distinguished from an omnidirectional speaker. When the electronic device 100 is worn around the neck of the user, the directional speaker 20 can be attached to the neck of the user such that the directional speaker 20 outputs sound in the direction of the ear of the user. When the directional speaker 20 is used, the user can recognize sound more clearly even when external noise is present. The positions of the second bodies B2 and B3 may be changed using one or more hinges such that the directional speaker 20 can face the ear of the user. While the directional speaker 20 is provided to the second bodies B2 and B3 in the specification, a conventional speaker may be provided to the second bodies B2 and B3.

The manipulation buttons 30 may be provided to the second bodies B2 and B3. The user may operate the electronic device 100 using the manipulation buttons 30. For example, the user can turn the electronic device 100 on/off, initiate/stop output of sound and control operation of the display 10 through the manipulation buttons 30.

Figure 2:
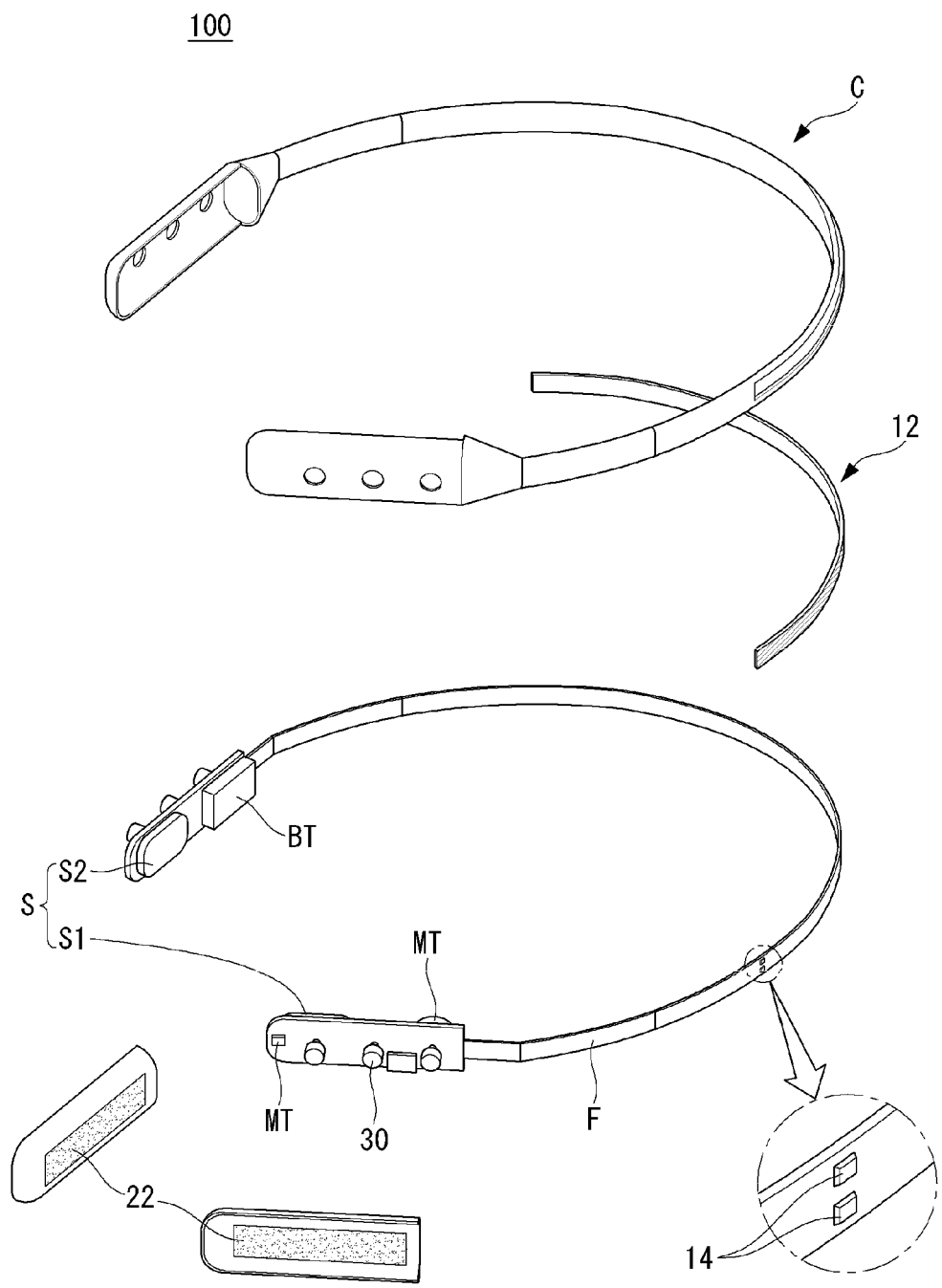

FIG. 2 is an exploded perspective view of the electronic device 100 according to an embodiment of the present invention. As shown, the electronic device 100 according to an embodiment of the present invention may include a case C that forms the exterior thereof and an electronic unit assembly F accommodated in the case C.

As described above, the case C may be formed of an elastic material. The case C may have a window 12 attached thereto.

The window 12 may be made of a transparent or translucent material such that light emitted from a light-emitting element 14 is visible from the outside. The window may have a unique color. Accordingly, even when the light-emitting element 14 emits colorless light, color of light seen outside can be changed depending on the color of the window 12.

A speaker cover 22 can cover a region corresponding to a speaker unit S.

The electronic unit assembly F may include electronic units necessary for operation of the electronic device 100. For example, the electronic unit assembly F can include a battery BT, the speaker unit S, a microphone MI, a vibration unit MT and the manipulation buttons 30.

The battery BT can store electrical energy necessary for operation of the electronic device 100. For charging of the battery BT, the electronic device 100 may include wired/wireless charging interfaces.

The speaker unit S may be a directional speaker. The speaker unit S may include first and second speaker units S1 and S2 respectively provided to the second bodies B2 and B3.

The microphone MI may be provided to one of the second bodies B2 and B3. For example, the microphone MI can be positioned at the end of the left second body B3. The microphone MI can be used in a telephone mode and the like.

The vibration unit MT may be operated according to a control signal of the controller to vibrate the second bodies B2 and B3. One or more vibration units MT may be provided. While the vibration unit MT is provided to the left second body B3 in the figure, the vibration unit MT may be provided to the right second body B2.

Figure 4:
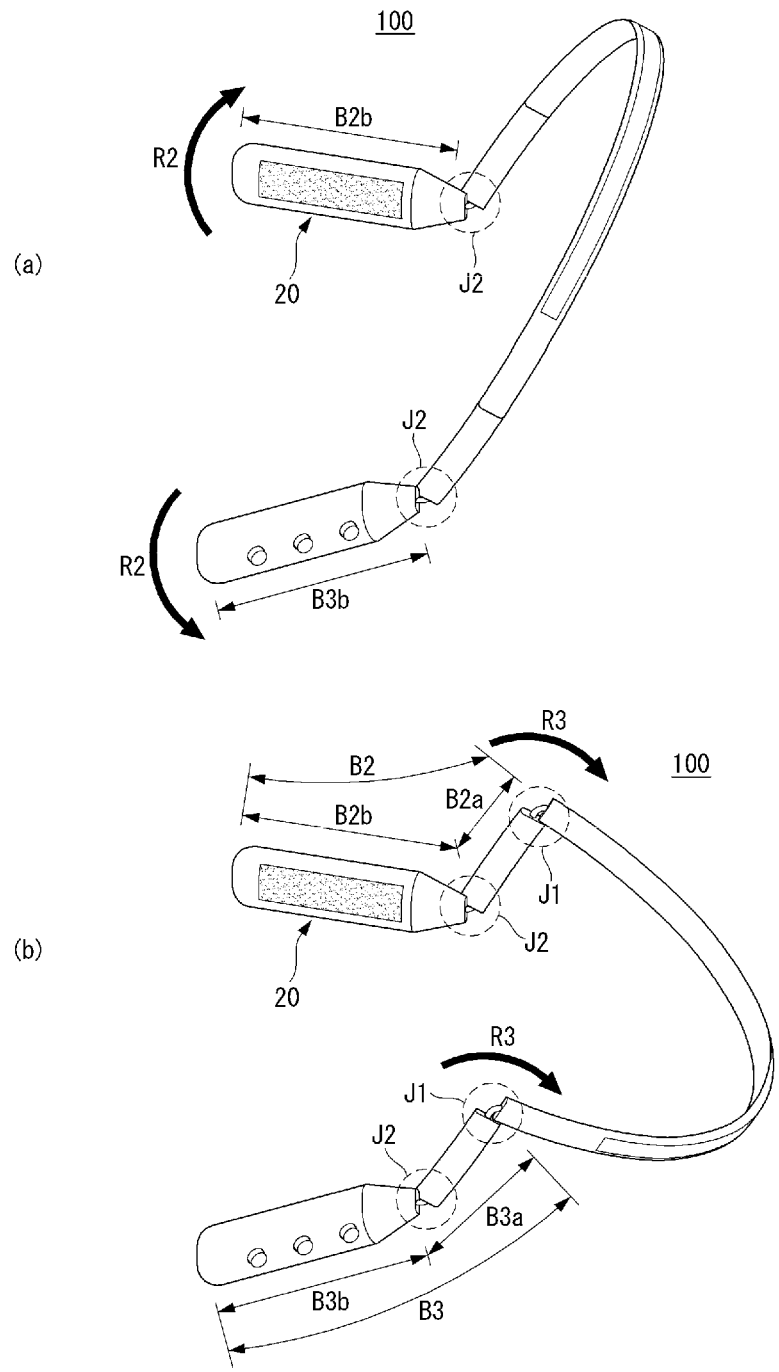

FIGS. 3 and 4 illustrate operation of the electronic device 100 according to an embodiment of the present invention. As shown, the electronic device 100 according to an embodiment of the present invention may include one or more joints J1 and J2 for moving the second bodies B2 and B3.

Referring to FIG. 3(a), the electronic device 100 may include the first body B1 and second bodies B2 and B3. The first body B1 may not include a joint. The second bodies B2 and B3 may include one or more joints J1 and J2. The first body B1 can be discriminated from the second bodies B2 and B3 through the joints J1 and J2. For example, the first joint J1 can be provided between the first body B1 and the second body B2. The right second body B2 and the left second body B3 may have the same structure or operation while being provided at different positions. Accordingly, a description of one of the second bodies B2 and B3 can be equally applied to the other unless otherwise mentioned.

The first joint J1 may be positioned between the first body B1 and the second body B2.

The second joint J2 may be provided to the inside of the second bodies B2 and B3. For example, the second joint J2 can be provided to one end of the directional speaker 20. That is, the second bodies B2 and B3 may be divided into upper second bodies B2a and B3a and lower second bodies B2b and B3b by the second joint J2, and the directional speaker 20 may be provided to the lower second bodies B2b and B3b.

Referring to FIG. 3(b), the lower second bodies B2b and B3b may be rotated in a direction R1 by the second joint J2. Since the directional speaker 20 is disposed in the lower second bodies B2b and B3b, the sound output direction of the directional speaker 20 can be changed according to rotation of the lower second bodies B2b and B3b.

Referring to FIG. 4(a), the lower second bodies B2b and B3b may be rotated in a direction R2. That is, the lower second bodies B2b and B3b can be rotated in a direction in which the ends of the directional speakers 20 respectively provided to the second bodies B2 and B3 are spaced apart from each other.

Referring to FIG. 4(b), the upper second bodies B2a and B3a may be rotated in a direction R3. That is, the entire second bodies B2 and B2 can rotate about the first joint J1.

Figure 5:
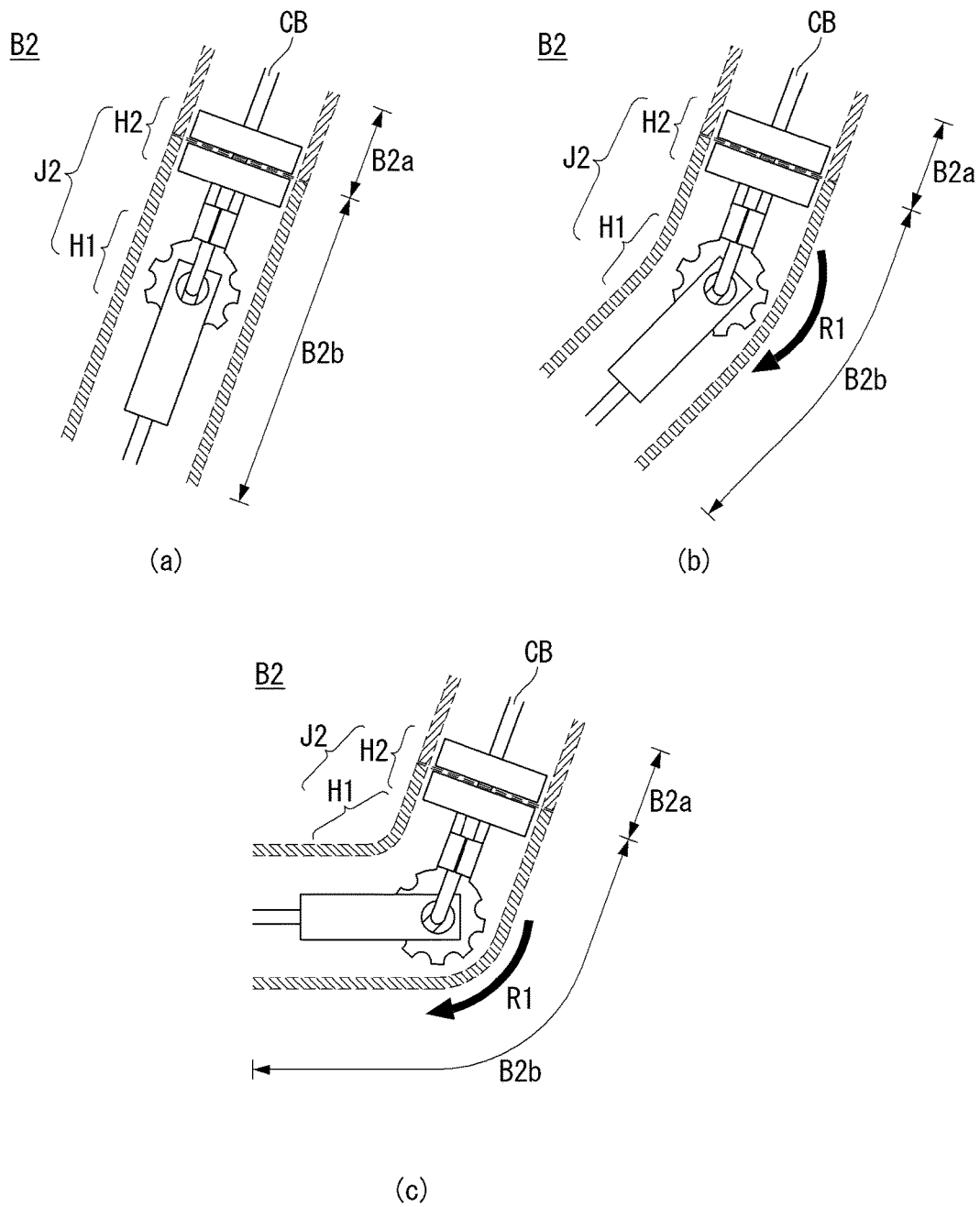

FIGS. 5, 6 and 7 illustrate the structure of the electronic device shown in FIG. 1.

As shown, the electronic device 100 according to an embodiment of the present invention can perform rotating operation according to user's intention by using first and second hinges H1 and H2 having different structures.

Referring to FIG. 5(a), the second joint J2 of the second body B2 may include the first and second hinges H1 and H2. The second body B2 may be bent in different directions according to the first and second hinges H1 and H2. For example, the first hinge H1 allows the lower second body B2b to be bent and the second hinge H2 allows the lower second body B2b to rotate with respect to the upper second body B2a.

A cable CB may transmit electronic signals in the electronic unit assembly F. The second joint J2 may have a structure by which the cable CB is not twisted. That is, the cable CB can be arranged in such a manner that the cable CB passes through the first hinge H1 in the thickness direction and then passes through the second hinge H2 in the direction of the central rotation axis. According to such arrangement of the cable CB, twisting of the cable CB can be minimized during bending operation according to the first hinge H1 and rotating operation according to the second hinge H2.

As shown in FIGS. 5(b) and 5(c), the first hinge H1 may be rotated in the direction R1. The lower second body B2b can be bent according to rotation of the first hinge H1 in the direction R1 and a bending degree can be controlled by the user.

Referring to FIG. 6(a), the first hinge H1 may be configured in such a manner that a first body SP1 and a second body SP2 are combined.

The first body SP1 may have a circular combining part G. The circular combining part G may have grooves CV formed on the outer surface thereof at predetermined intervals.

A connecting pin PN may be provided to the second body SP2. The connecting pin PN may be pressed by an elastic body SP. That is, the connecting pin PN can be pressed such that the end of the connecting pin PN is inserted into a groove CV.

Referring to FIG. 6(b), when force is applied to the first body SP1 and/or the second body SP2, the first and second bodies SP1 and SP2 may rotate with respect to each other. That is, when force stronger than the elastic force of the elastic body SP is applied in the direction R1, the connecting pin PN can escape from the groove CV and then be inserted into a neighboring groove CV. Rotating degrees of the first and second bodies SP1 and SP2 may depend on the magnitude of force applied thereto and/or time for which force is applied thereto. When the applied force is released, the first and second bodies SP1 and SP can be fixed by the elastic body SP inserted into the groove CV.

Referring to FIG. 7(a), the upper second body B2a and the lower second body B2b may be rotated relative to each other by the second hinge H2.

Referring to FIG. 7(b), the lower second body B2b may be rotated in a direction R2 by the second hinge H2 according to external force applied thereto.

FIGS. 8 and 9 illustrate states in which the user wears the electronic device shown in FIG. 1.

As shown, the electronic device 100 according to an embodiment of the present invention can effectively output sound using the directional speaker 20.

Referring to FIGS. 8(a) and 8(b), the electronic device 100 can be worn around the neck NE of the user. The electronic device 100 worn around the neck can output sound toward the user.

The directional speaker 20 can output sound in a specific direction. For example, sound is louder in the direction of the directional speaker 20 than in other directions. The directional speaker 20 can face both ears E1 and E2 of the user. For example, a right directional speaker 22 can output sound to the right ear E1 and a left directional speaker 23 can output sound to the left ear E2.

Referring to FIG. 9(a), the microphone MI may be provided to the left second body B3. The microphone MI and the mouse MO of the user may be spaced apart from each other by D1.

Referring to FIG. 9(b), the position of the left second body B3 having the microphone MI may be changed such that the microphone MI and the mouse MO of the user are spaced apart from each other by D2. For example, when appropriate force is applied to the left second body B3 in a situation in which the microphone MI is necessary, such as in the telephone mode, the left second body B3 can be bent upward according to the second joint J2. When the distance between the microphone MI and the mouse MO of the user is changed to D2 according to bending of the left second body B3, user voice can be clearly transmitted to the microphone MI.

Figure 10:
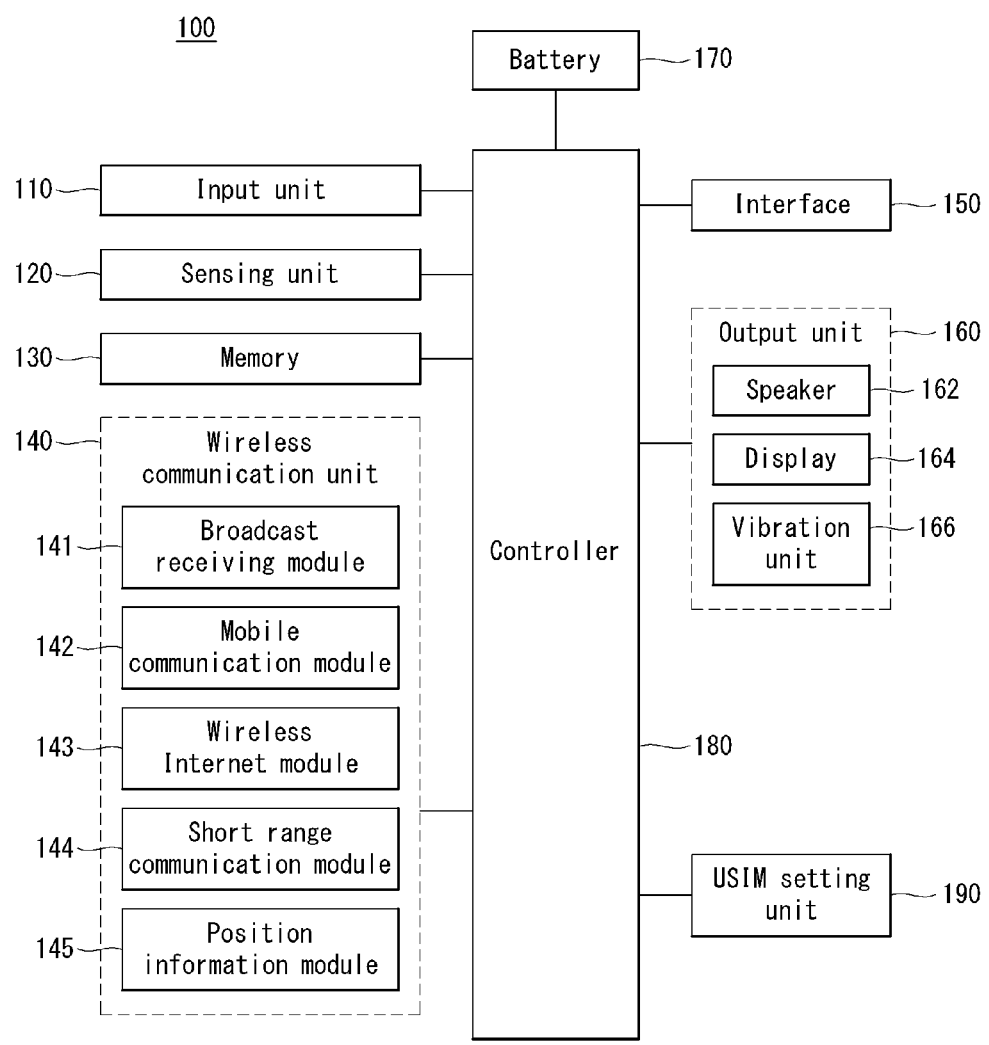
FIG. 10 is a block diagram of the electronic device shown in FIG. 1.

FIG. 10 is a block diagram of the electronic device shown in FIG. 1.

As shown, the electronic device 100 according to an embodiment of the present invention may include various components necessary for operation thereof. A specific component can execute a specific function of the electronic device 100 according to an embodiment of the present invention and/or components can execute specific functions through data exchange therebetween.

An input unit 110 may include components for receiving information from a user. For example, the input unit 110 can include the manipulation buttons 30 provided to the electronic device 100 and the microphone MI for acquiring audio signals such as a voice command of the user.

A sensing unit 120 may include at least one sensor for sensing internal information and/or external information of the electronic device 100. For example, the sensing unit 120 can include at least one of a proximity sensor, an illumination sensor, a touch sensor, an acceleration sensor, a magnetic sensor, a G-sensor, a gyroscope sensor, a motion sensor, an RGB sensor, an infrared (IR) sensor), a finger scan sensor, an ultrasonic sensor, an optical sensor (e.g. camera), a battery gauge, an environment sensor (e.g. barometer, hygrometer, thermometer, radioactive sensor, heat sensor, gas sensor and the like) and a chemical sensor (e.g. electronic nose, healthcare sensor, biometric sensor and the like). The electronic device 100 according to an embodiment of the present invention can combine information sensed by at least two of such sensors and use the combined information.

The sensing unit 120 may include sensors for sensing the heart rate and/or body temperature of the user. For example, the sensors for sensing the heart rate and/or body temperature of the user can be provided to the portion of the electronic device, which comes into contact with the neck NE of the user.

A memory 130 stores data supporting various functions of the electronic device 100. The memory 130 may store application programs (or applications) executed in the electronic device 100, data for operation of the electronic device 100 and commands. At least part of the application programs may be downloaded from external servers through wireless communication. In addition, at least part of the application programs may be installed in the electronic device 100 during manufacture for fundamental functions (e.g. functions of receiving and sensing a call and functions of receiving and sending a message). The application programs may be stored in the memory 130, installed in the electronic device 100 and executed by the controller 180 to perform operations (or functions) of the electronic device.

A wireless communication unit 140 may include one or more modules that enable wireless communication between the electronic device 100 and a wireless communication system, between the electronic device 100 and a mobile terminal 200 or between the electronic device 100 and an external server. For example, the wireless communication unit 140 may include at least one of a broadcast receiving module 141, a mobile communication module 142, a wireless Internet module 143, a short-range communication module 144 and a position information module 145.

An interface functions as a passage between the electronic device 100 and various types of external devices connected to the electronic device 100. The interface 150 may include at least one of a wired/wireless headset port, an external charger port, a wired/wireless data port, a memory card port, a port for connection of a device including an identification module, an audio input/output (I/O) port, a video I/O port and an earphone port. The electronic device 100 can perform appropriate control related to an external device connected to the interface 150.

An output unit 160 can generate visual, aural or tactile output. The output unit 160 may include a speaker 162, a display 164 and/or a vibration unit 166.

A battery 170 can store external power supplied thereto. The battery may be an embedded battery or a replaceable battery.

The controller 180 controls the overall operation of the electronic device 100 in addition to operations related to the application programs. The controller 180 can provide appropriate information or functions to the user or process the information and functions by processing signals, data, information and the like, input or output through the aforementioned components, or executing application programs stored in the memory 130.

The controller 180 can control at least part of the components in order to execute application programs stored in the memory 130. Furthermore, the controller 180 can combine and operate at least two components included in the electronic device 100 in order to execute the application programs.

A USIM setting unit 190 may be a part for connecting a USIM card of the mobile communication module 142 of the electronic device 100 for wireless communication. A USIM slot for inserting a USIM card may be provided to one side of the body of the electronic device 100. The user can insert a desired USIM card into the USIM card setting unit 190 to use the USIM card. The USIM card may store information for identifying the electronic device 100 for wireless communication.

Figure 11:
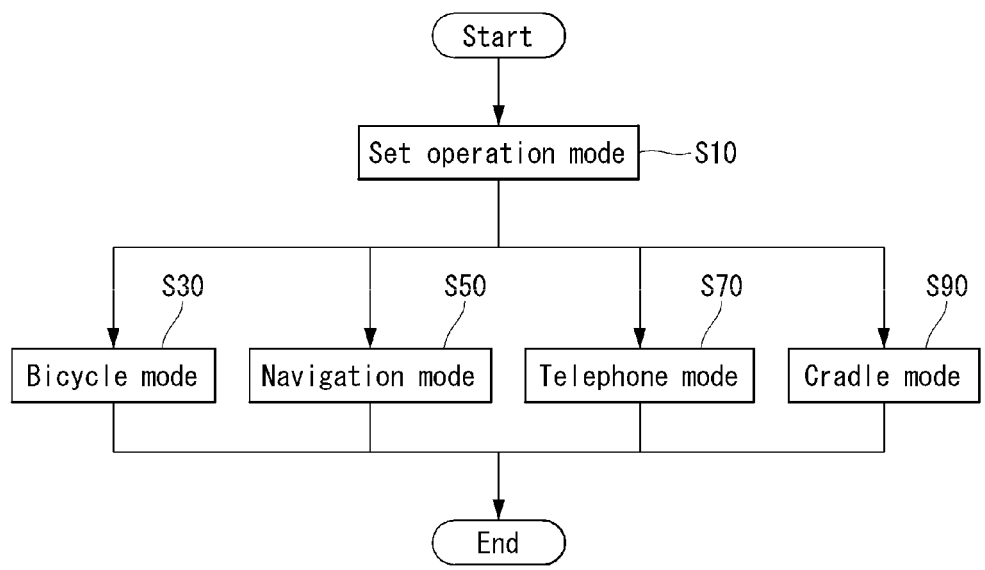
FIG. 11 is a flowchart illustrating operation of the electronic device shown in FIG. 1.

FIG. 11 is a flowchart illustrating operations of the electronic device shown in FIG. 1.

As shown, the controller 180 of the electronic device 100 according to an embodiment of the present invention may set an operation mode (S10).

The operation mode may be set depending on the purpose of operation of the electronic device 100. The electronic device 100 may be used along with another device. The controller 180 may set the operation mode on the basis of input from the user and/or information acquired through the sensing unit 120. For example, the controller 180 can determine whether the user wears the electronic device 100 on the basis of the pulse and/or body temperature of the user, acquired through the sensing unit 120. The controller 180 may determine whether the user gets on a bicycle on the basis of a moving speed acquired through the sensing unit 120.

The controller 180 may control the electronic device 100 to operate in specific modes including a bicycle mode S30, a navigation mode S50, a telephone mode S70 and a cradle mode S90 on the basis of information acquired through the sensing unit 120.

The operation mode may be displayed on a display 251 of a mobile terminal 200 operating in connection with the electronic device 100. For example, the bicycle mode of the electronic device 100 can be displayed on the display 251 such that the user can immediately recognize the state of the electronic device 100.

The electronic device 100 may simultaneously operate in two or more operation modes. For example, the electronic device 100 can operate in the navigation mode while operating in the bicycle mode.

Figure 12:
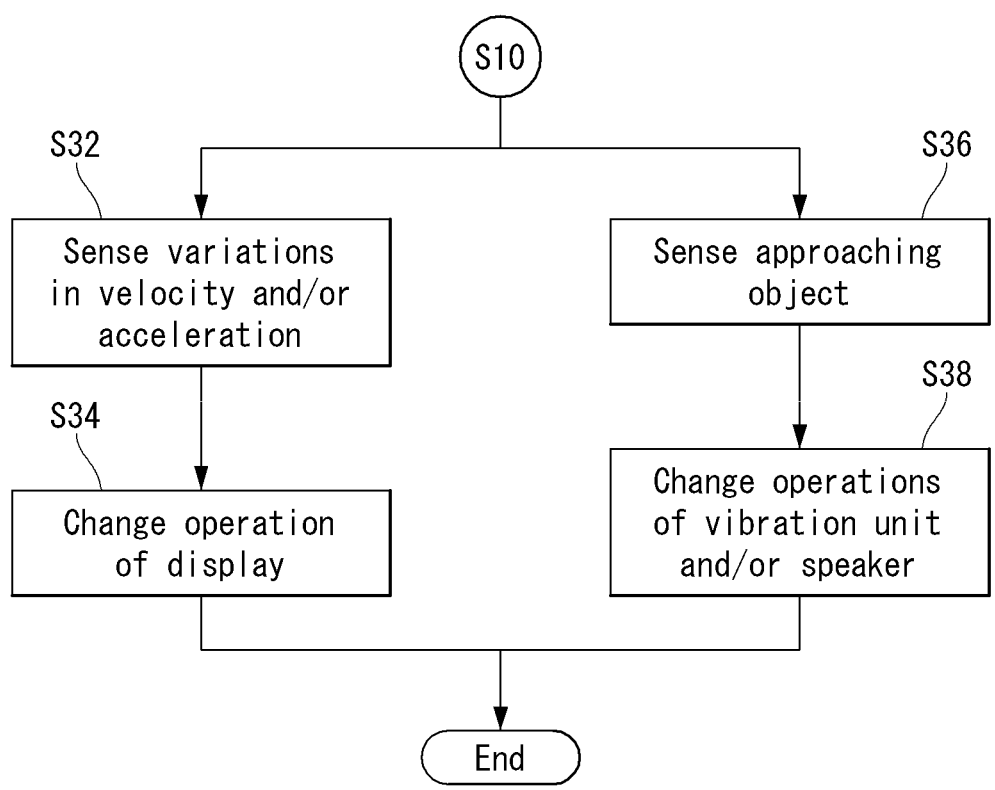
FIG. 12 is a flowchart illustrating a bicycle mode in the operation shown in FIG. 11.

FIG. 12 is a flowchart illustrating bicycle mode operation from among the operations shown in FIG. 11 and FIGS. 13 to 17 illustrate the bicycle mode operation of FIG. 12.

As shown, the controller 180 of the electronic device 100 according to an embodiment of the present invention may control the electronic device 100 to operate in the bicycle mode.

Referring to FIG. 12, variations in speed and/or acceleration may be sensed (32).

A speed and/or acceleration can be sensed through the sensing unit 120. For example, the corresponding value can be acquired through the speed sensor and/or acceleration sensor.

The controller 180 may change operation of the display 10 (S34).

The controller 180 may evaluate the sensed speed/acceleration. For example, the controller 180 can determine variations in speed and/or acceleration. The controller 180 may change operation of the display 10 on the basis of the determination result. For example, the controller 180 can activate or deactivate the display 10 or change colors.

An approaching object may be sensed (S36) and operations of the vibration unit 166 and/or the speaker 162 may be changed (S38).

The sensing unit 120 can sense an object approaching the user who wears the electronic device 100.

The controller 180 can change operations of the vibration unit 166 and/or the speaker 162 when an object approaches the user. For example, the controller 180 can switch the vibration unit 166 and/or the speaker 162 from a deactivated state to an activated state. Specifically, the controller 180 can control a vibration unit 166 in a specific direction from among the left and right vibration units 155 to operate such that the user can perceive the direction of the approaching object.

Referring to FIGS. 13(*a*) and 13(*b*), the display 10 may be provided to the outer side of the first body B1 of the electronic device 100. That is, when the user wears the electronic device 100, the display 10 is visible from behind. Accordingly, the controller 180 can provide information to a person behind the user by activating or deactivating the display 10 or changing the color of the activated display 10 and/or flicking the display 10. For example, the person behind the user can recognize a speed change of the user through the display 10.

Figure 14:
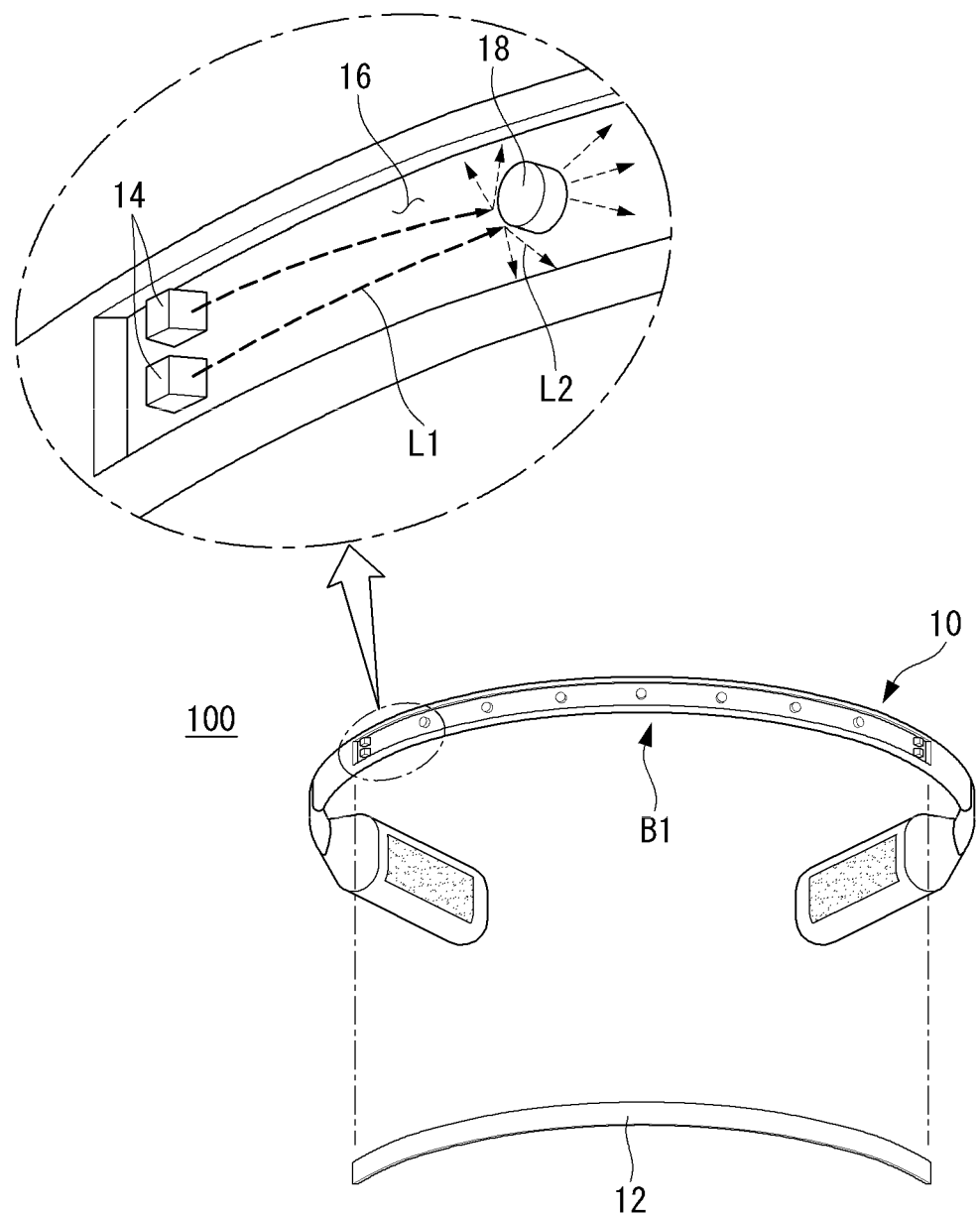

Referring to FIG. 14, the window 12 may be attached to the surface of the display 10 of the electronic device 100.

The light-emitting element 14 may be provided to the inner surface of the window 12. For example, the light-emitting element 14 can be provided to a groove 16 formed in the first body B1 of the electronic device 100. The light-emitting element 14 may be provided to both ends of the groove 16.

The light-emitting element 15 may emit light L1 according to a control signal of the controller 180. The light L1 emitted from the light-emitting element 14 can be transmitted along the groove 16. The groove 16 may have a plurality of scattering protrusions 18 provided thereon.

The plurality of scattering protrusions 18 may be disposed at a predetermined interval. The scattering protrusions 18 can send and/or scatter the light L1 emitted from the light-emitting element 14 to the window 12. For example, the light L1 emitted from the light-emitting element 15 can be reflected and/or refracted by the scattering protrusions 18 and thus the direction of the light L1 is changed to the direction of the window 12.

Since the direction of the light L1 is changed toward the window 12 by the scattering protrusions 18, it is possible to prevent only a specific portion of the display 10 from brightening or darkening. That is, light is properly scattered by the scattering protrusions 18 positioned at a predetermined interval along the groove 16 so as to be transmitted in the direction of the window 12, achieving uniform brightness of the display 10.

Figure 15:
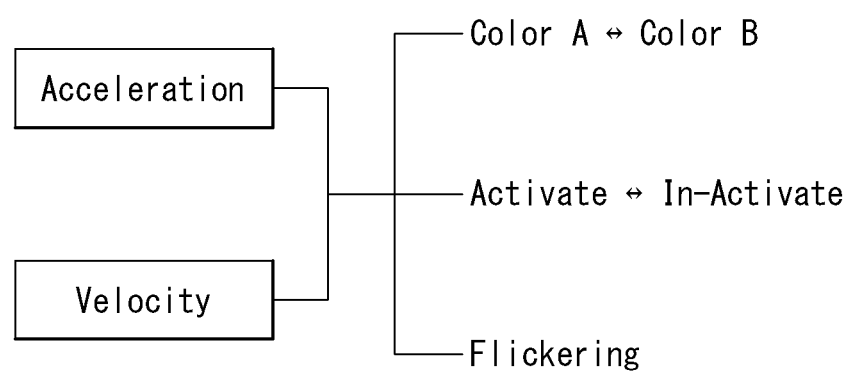
Figure 16:
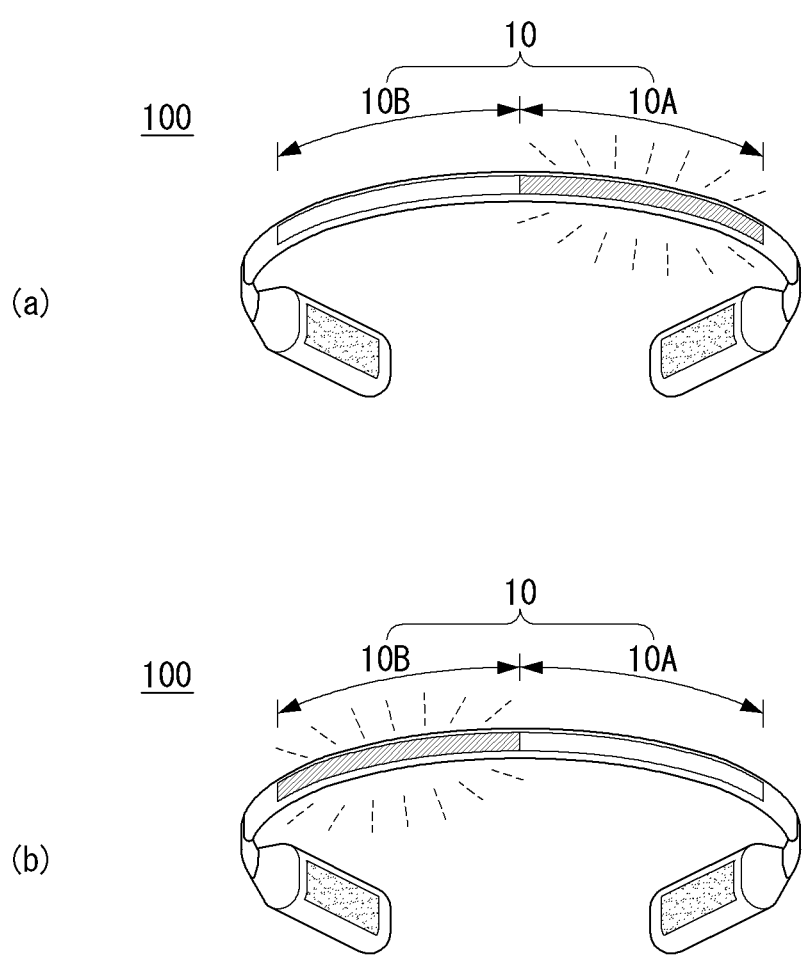
Figure 17:
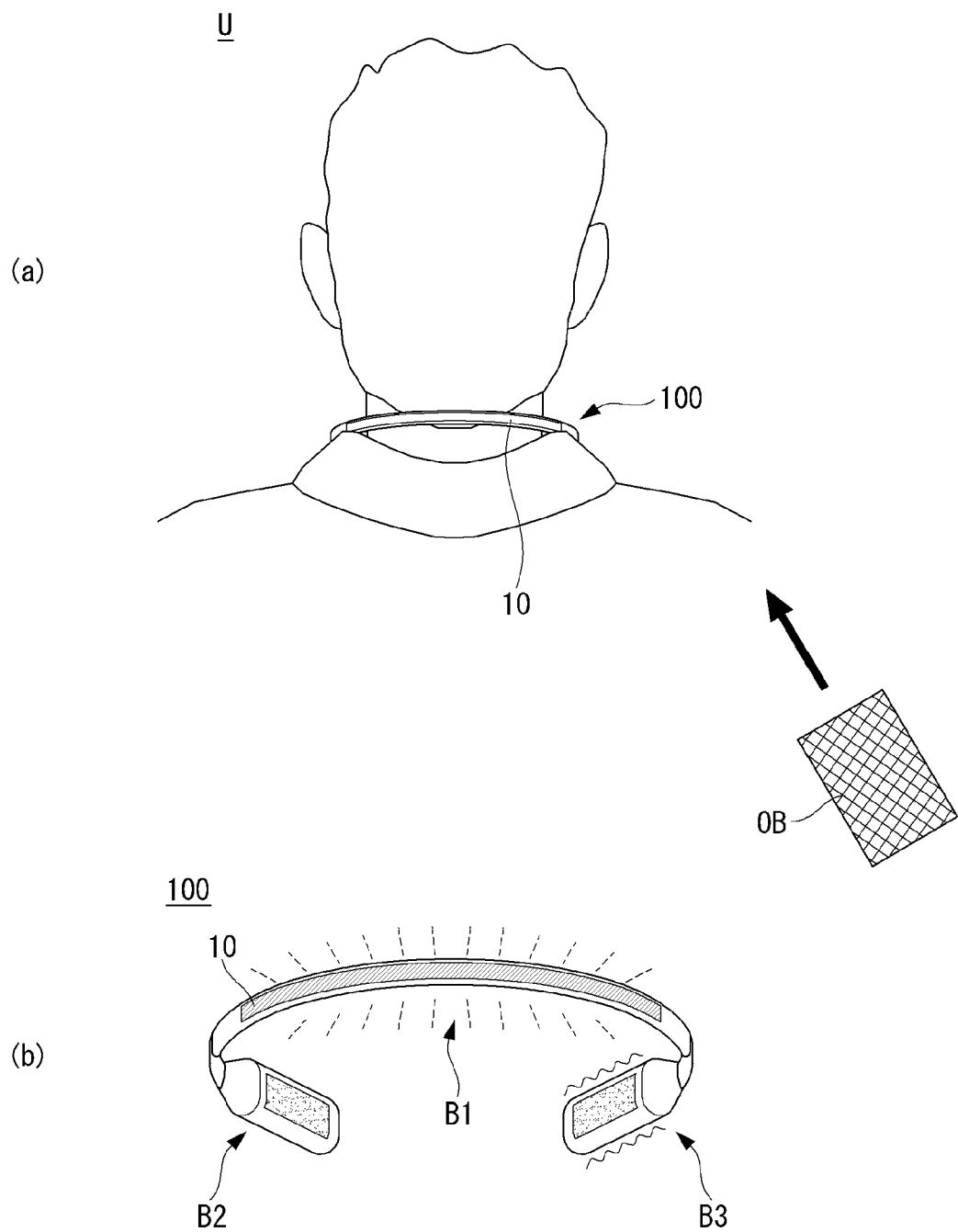

Referring to FIG. 15, the controller 180 may change the color of the display 10, activate/deactivate the display 10 or control the display 10 to flicker on the basis of acceleration and/or velocity. For example, the controller 180 can change the color of the display 10 to yellow at a first velocity, to green at a second velocity and to red at a third velocity. When velocity is close to zero for a predetermined period or longer, the controller 180 can deactivate the display 10 so as to save battery power. For example, the controller 180 can control the display 10 to flicker so as to call attention of a person behind the user wearing the electronic device 100 to the user when the velocity of the user abruptly decreases.

Referring to FIGS. 16(a) and 16(b), the display 10 may be divided into a plurality of areas. For example, the display 10 can be divided into a first area 10A and a second area 10B.

The respective areas may emit different colors of light. For example, the first area 10A can emit yellow light while the second area 10B emits blue light.

The controller 180 may selectively activate the first and second areas 10A and 10B according to situations. For example, the controller 180 can control the first area 10A to emit light upon sensing that the user riding a bicycle is turning right such that a person following the user can recognize turning of the user.

Referring to FIG. 17(a), an object OB may approach the user U. For example, a car can approach the user U from behind. Approach of the object OB can be sensed using a proximity sensor, an infrared sensor and the like.

Referring to FIG. 17(b), when the object OB approaches, the controller 180 can activate the display 10. That is, a driver of the car approaching the user U from behind can recognize presence of the user U.

The controller 180 may operate the vibration unit 166. For example, the controller 180 can operate the vibration unit 166 provided inside of the right second body B3 corresponding to the direction of the approaching object OB. Accordingly, the user can recognize approach of the object PB and the direction of the approaching object OB without looking back.

Figure 18:
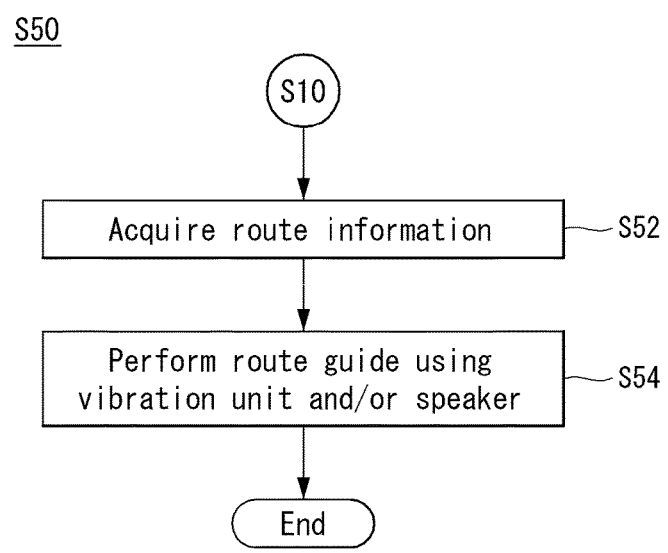
FIG. 18 is a flowchart illustrating a navigation mode in the operation shown in FIG. 11.
Figure 19:
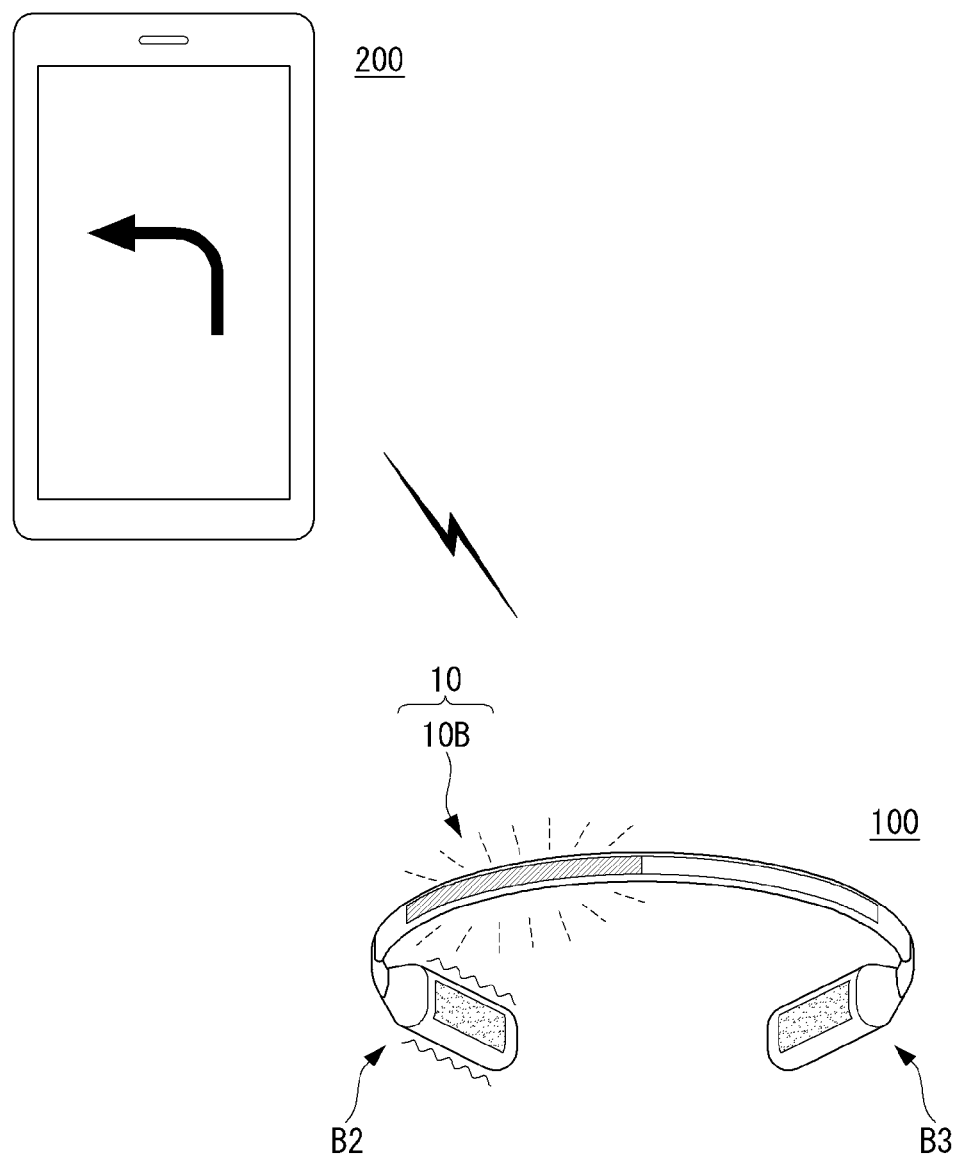
FIG. 19 illustrates operation in the navigation mode of FIG. 18.

FIG. 18 is a flowchart illustrating navigation mode operation in the operations shown in FIG. 11 and FIG. 19 illustrates the navigation mode operation.

As shown, the controller 180 of the electronic device 100 according to an embodiment of the present invention may acquire route information (S52) and perform route guidance (S54) using the vibration unit and/or the speaker in step (S50) of executing the navigation mode.

The route information may be acquired from another device connected to the electronic device 100. For example, when the user has a mobile terminal and the electronic device 100 is connected to the mobile terminal through Wi-Fi, the route information can be acquired from the mobile terminal.

The route information may include route guide data. For example, the route information may be information indicating left turn or right turn.

The controller 180 can perform route guide by operating the vibration unit 166. For example, the controller 180 can operate the right vibration unit 166 when the user needs to turn right and operate the left vibration unit 166 when the user needs to turn left.

The controller 180 can perform route guide by operating the speaker 162. For example, the controller 180 can perform voice guide such as "turn left 50 m ahead" through the speaker 162.

Referring to FIG. 19, the electronic device 100 may acquire data from the mobile terminal 200. For example, the electronic device 100 can acquire route information.

The controller 180 can control the electronic device 100 on the basis of the acquired route information. For example, the controller 180 can control the vibration unit 166, included in the left second body B2 corresponding to the direction indicated by the route information, to operate. For example, the controller 180 can control the left display 10B corresponding to the direction indicated by the route information to operate. The user wearing the electronic device 100 can easily recognize the direction through vibration. In addition, a person located behind the user wearing the electronic device 100 can easily recognize the direction in which the user will turn.

Figure 20:
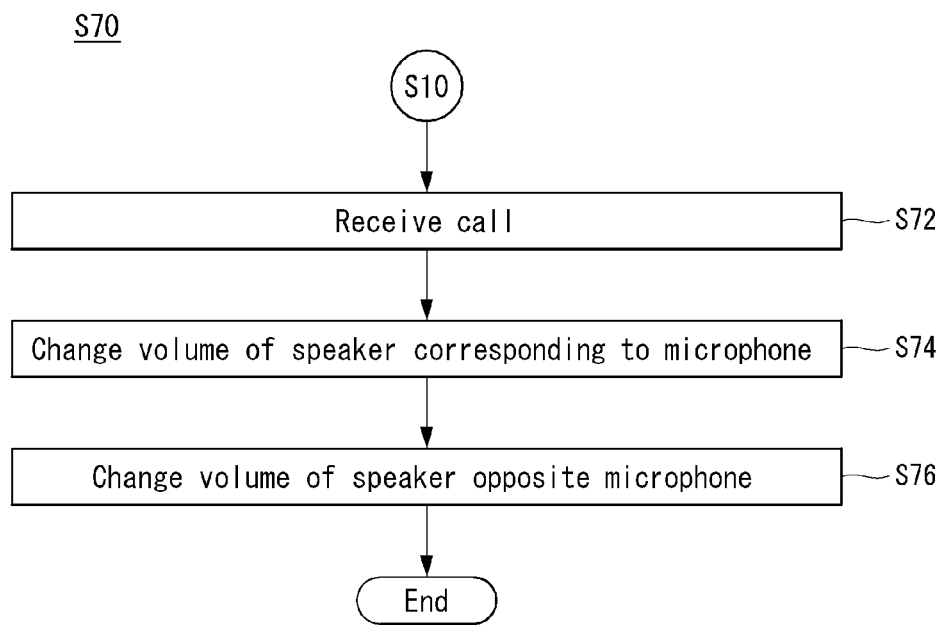
FIG. 20 is a flowchart illustrating a telephone mode in the operation shown in FIG. 11.

FIG. 20 is a flowchart illustrating a telephone mode operation in the operations shown in FIG. 11 and FIG. 21 is a view for explaining the telephone mode operation.

As shown, the controller 180 of the electronic device 100 according to an embodiment of the present invention can control the electronic device 100 upon reception of a call.

Referring to FIG. 20, a step S70 of executing the telephone mode may include a step S72 of receiving a call.

The call may be received from the mobile terminal carried by the user. That is, the call can be received from an external device connected to the electronic device 100.

The controller 180 can change the speaker volume of the microphone (S74).

Upon reception of a call, user voice can be acquired through the microphone MI. To acquire clear user voice, the controller 180 can change the volume of the speaker 162 corresponding to the second bodies B2 and B3 having the microphone MI provided thereto. For example, the controller 180 can minimize sound output or temporarily deactivate the speaker 162.

The controller 180 can change the volume of the speaker opposite the microphone (S76).

When the volume of the speaker 162 corresponding to the second bodies B2 and B3 having the microphone MI is decreased, the controller 180 can increase the volume of the opposite speaker 162. The user can hear music and/or voice of the calling party clearly by decreasing the volume of the speaker at one side and increasing the volume of the speaker at the other side.

Referring to FIG. 21(a), the user may listen to music through the speaker 20.

Referring to FIG. 21(b), upon generation of a specific event such as reception of a call, the controller 180 can deactivate the speaker 20 provided to the region in which the microphone MI is disposed and adjust the volume of the opposite speaker 20.

Figure 22:
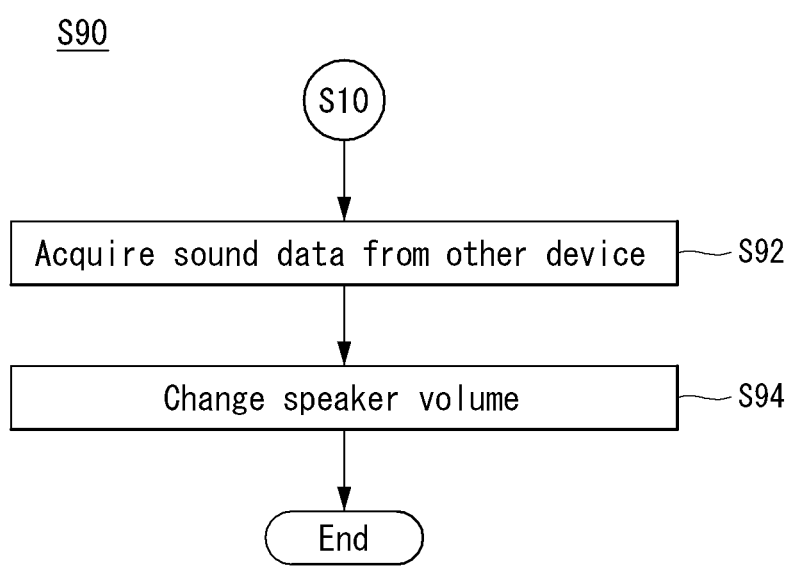
FIG. 22 is a flowchart illustrating a cradle mode in the operation shown in FIG. 11.
Figure 23:
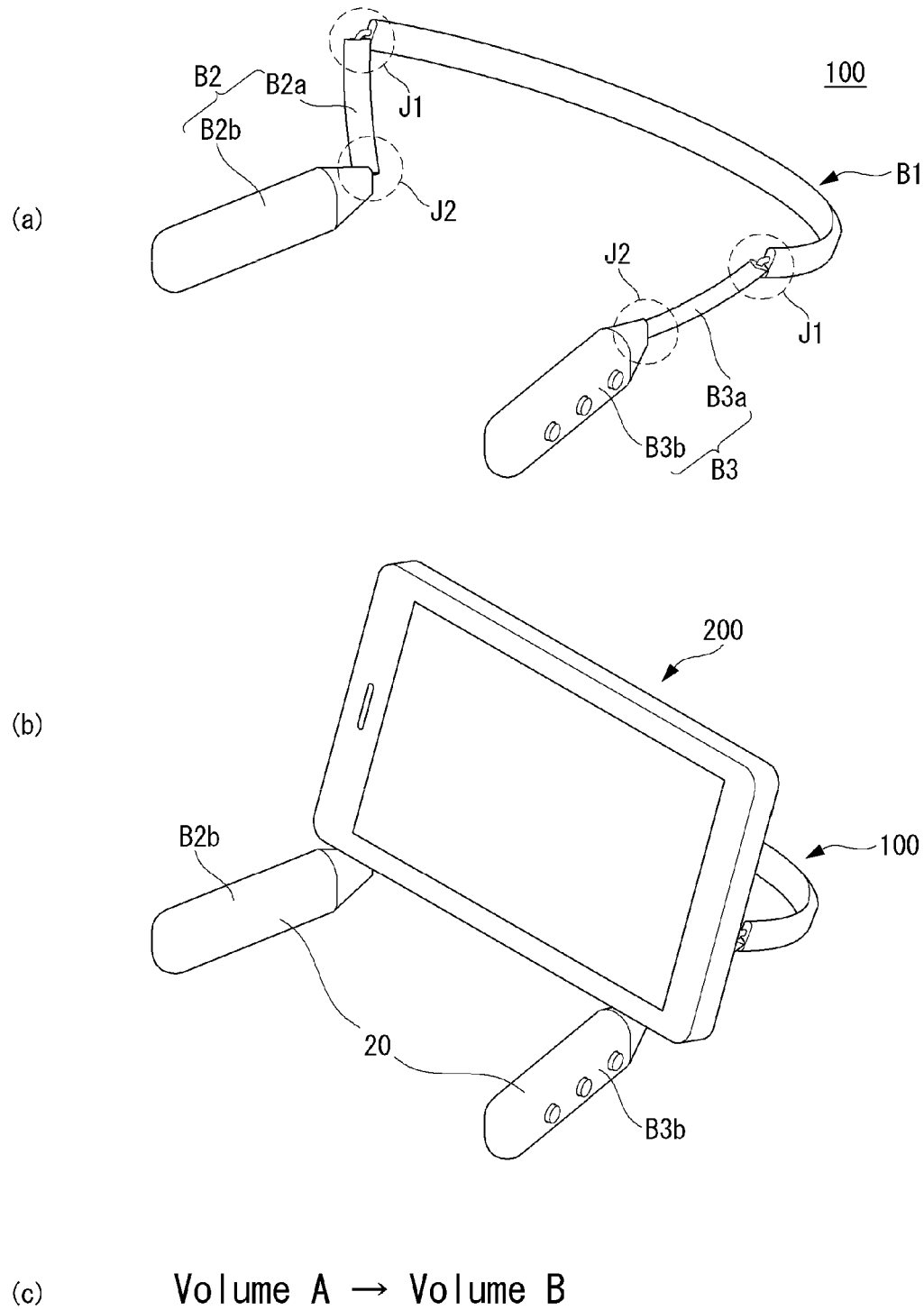
FIG. 23 illustrates operation in the cradle mode of FIG. 22.

FIG. 22 is a flowchart illustrating a cradle mode operation in the operations shown in FIG. 11 and FIG. 23 is a view for explaining the cradle mode operation.

As shown, the electronic device 100 according to an embodiment of the present invention may perform operation corresponding to the cradle mode.

Referring to FIG. 22, a cradle mode operation step S90 may include a step S92 of acquiring sound data from another device and a step S94 of changing the speaker volume.

The electronic device 100 may acquire data from another device connected thereto in a wired or wireless manner. The acquired data may include sound data.

When the electronic device 100 is used in the cradle mode, the controller 180 can change the speaker volume of the electronic device 100. For example, the controller 100 can increase the speaker volume from the volume prior to the cradle mode operation. This is operation considering that the distance between the ears of the user and the electronic device 100 may increase since the electronic device 100 is placed on a desk or floor in the cradle mode. That is, the controller 100 can increase the speaker volume since the distance between the electronic device 100 and the user increases.

The controller 180 may deactivate directivity of the speaker when the electronic device 100 is used in the cradle mode. That is, the controller 180 can control the speaker to output sound omnidirectionally. According to this operation, multiple users can watch the electronic device 100 when the electronic device 100 is used in the cradle mode.

Referring to FIG. 23(a), the electronic device 100 may change the shape thereof to a specific shape through manipulation of the first and second joints J1 and J2. That is, the second body B2 may be bent with respect to the first body B1 and the lower second body B2b and B3b may be bent to the outside.

Referring to FIG. 23(b), another device 200 may be mounted on the electronic device 100. The controller 180 can recognize whether the other device 200 is mounted on the electronic device 100 by sensing the other device through a proximity sensor or the like or according to mode setting by the user.

Referring to FIG. 23(c), when the other device 200 is mounted on the electronic device 100, the controller 180 can change the volume of the speaker 20. For example, the controller 180 can increase the speaker volume. Accordingly, even when multiple users watch the electronic device 100 and/or the user is at a distance from the speaker 20, sound output from the speaker can be clearly recognized.

The controller 180 may selectively change the volume of the speaker 20 even when the other device 200 is not directly mounted on the electronic device 100. For example, when the shape of the electronic device 100 is changed, as shown in FIG. 23(a), the controller 180 can automatically change the volume of the speaker 20.

Figure 24:
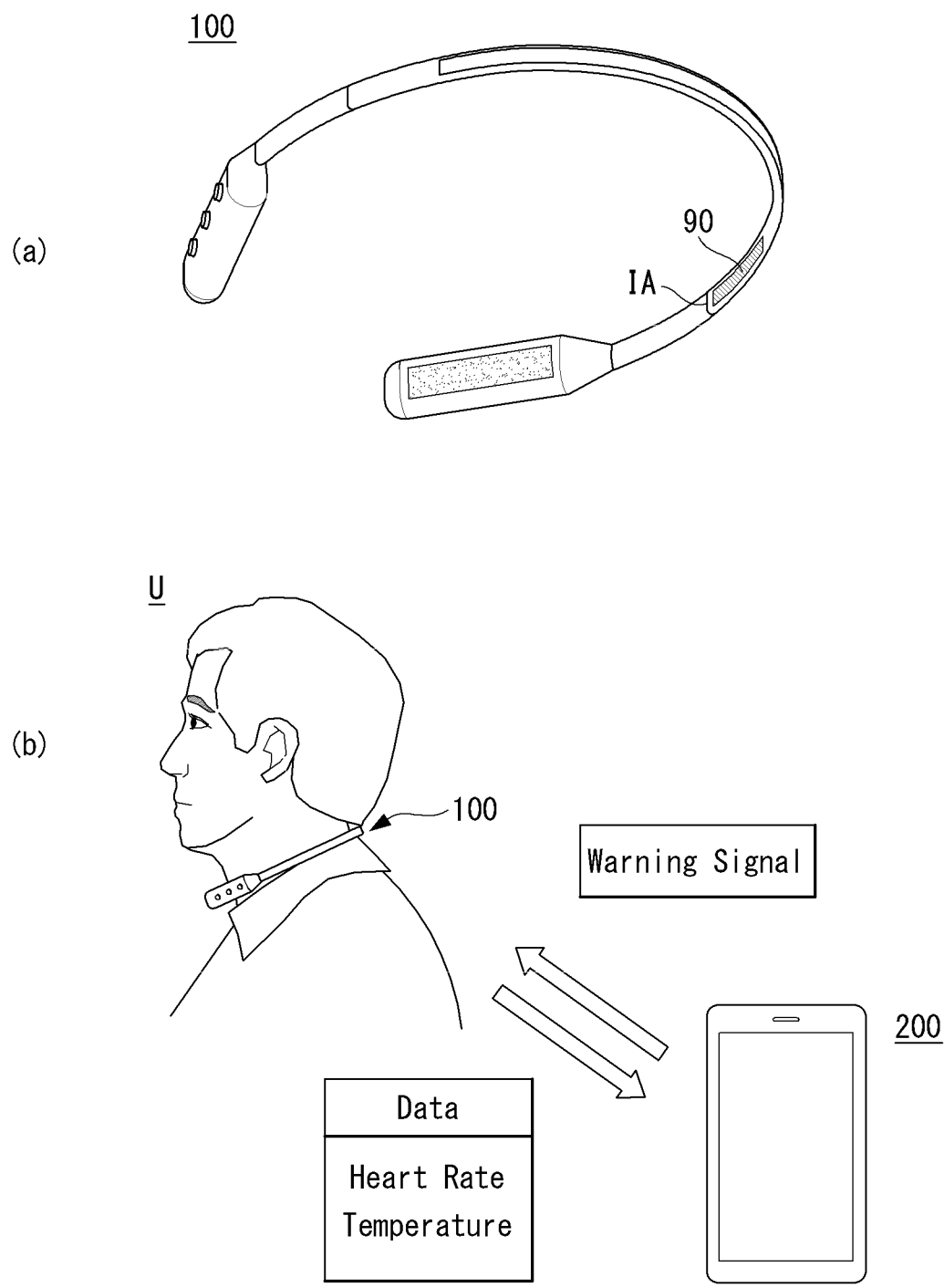
FIG. 24 illustrates another operation of the electronic device shown in FIG. 1.

FIG. 24 illustrates another operation of the electronic device shown in FIG. 1.

As shown, the controller 180 of the electronic device 100 according to an embodiment of the present invention can acquire a biometric signal of the user and perform operation related to the biometric signal.

Referring to FIG. 24(a), a biometric signal sensor 90 may be provided to the inside area IA of the body of the electronic device 100. That is, the biometric signal sensor 90 can be provided to a portion of the electronic device 100, which naturally comes into contact with the body of the user when the user wears the electronic device 100. The controller 180 can acquire the heart rate and/or body temperature of the user through the biometric signal sensor 90.

Referring to FIG. 24(b), the electronic device 100 may transmit the biometric signal acquired from the user U to another device 200. The other device 200 may be a terminal carried by the user and/or an external server. The other device 200 may store a larger amount of data than the electronic device 100 and have a function of analyzing a sensed biometric signal.

FIGS. 25 to 30 illustrate operations of the electronic device shown in FIG. 1 and a mobile terminal.

As shown, the electronic device 100 according to an embodiment of the present invention can exchange information with the mobile terminal 200 carried by the user. That is, the electronic device 100 and the mobile terminal 200 can exchange information and perform operations optimized therefor.

Figure 25:
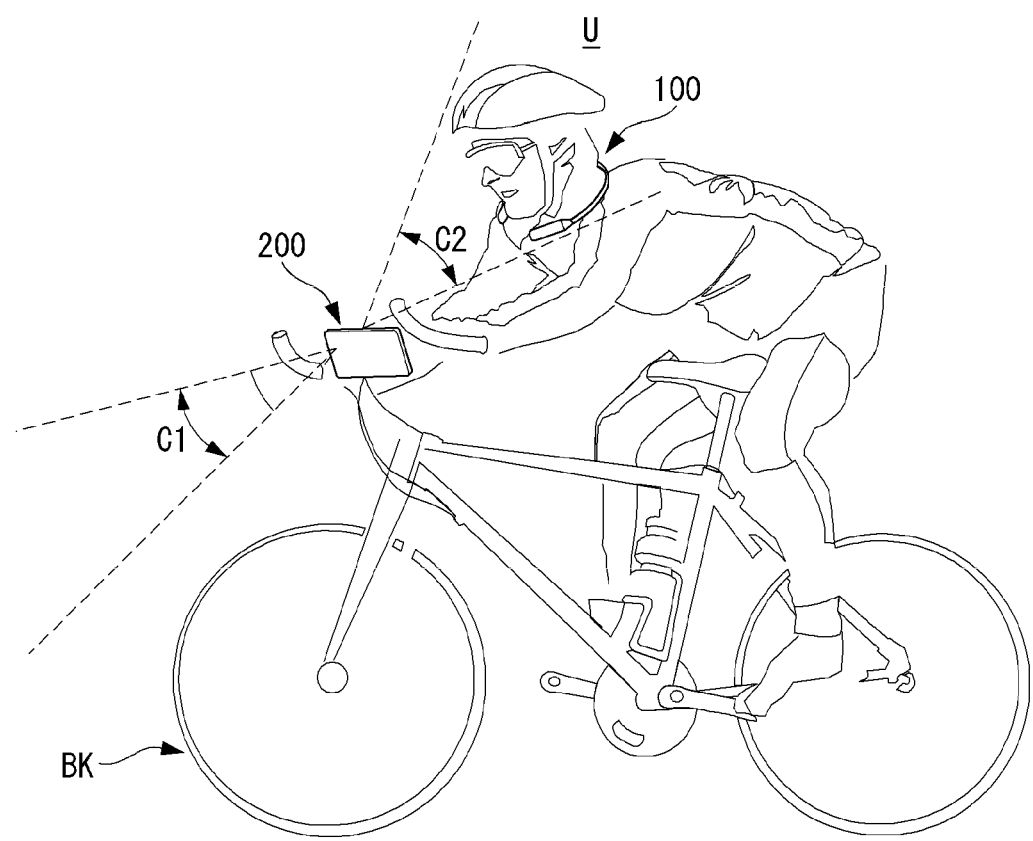

Referring to FIG. 25, the user U may ride a bicycle BK. When the user rides the bicycle BK, the electronic device 100 can operate in a bicycle mode. Switching to the bicycle mode may be performed by sensing the moving speed of the user and/or a moving route and/or through setting of the user. The user U riding the bicycle BK may attach the mobile terminal 200 to the bicycle BK.

When the user carries the mobile terminal 200, the electronic device 100 can communicate with the mobile terminal 200. The electronic device 100 can enable the mobile terminal 200 to perform specific operation by communicating with the mobile terminal 200. Furthermore, the mobile terminal 200 may perform operation corresponding to a current mode. For example, the mobile terminal 200 can photograph a front region (C1) and/or a rear region C2 using a camera. The photographed image can be stored in the mobile terminal 200, an external server and/or the electronic device 100. That is, operation of a bicycle black box using the camera of the mobile terminal 200 can be performed. When a camera is embedded in the electronic device 100, the mobile terminal 200 and/or the electronic device 100 may take an image of a rear region of the user using the camera of the electronic device 100.

Figure 26:
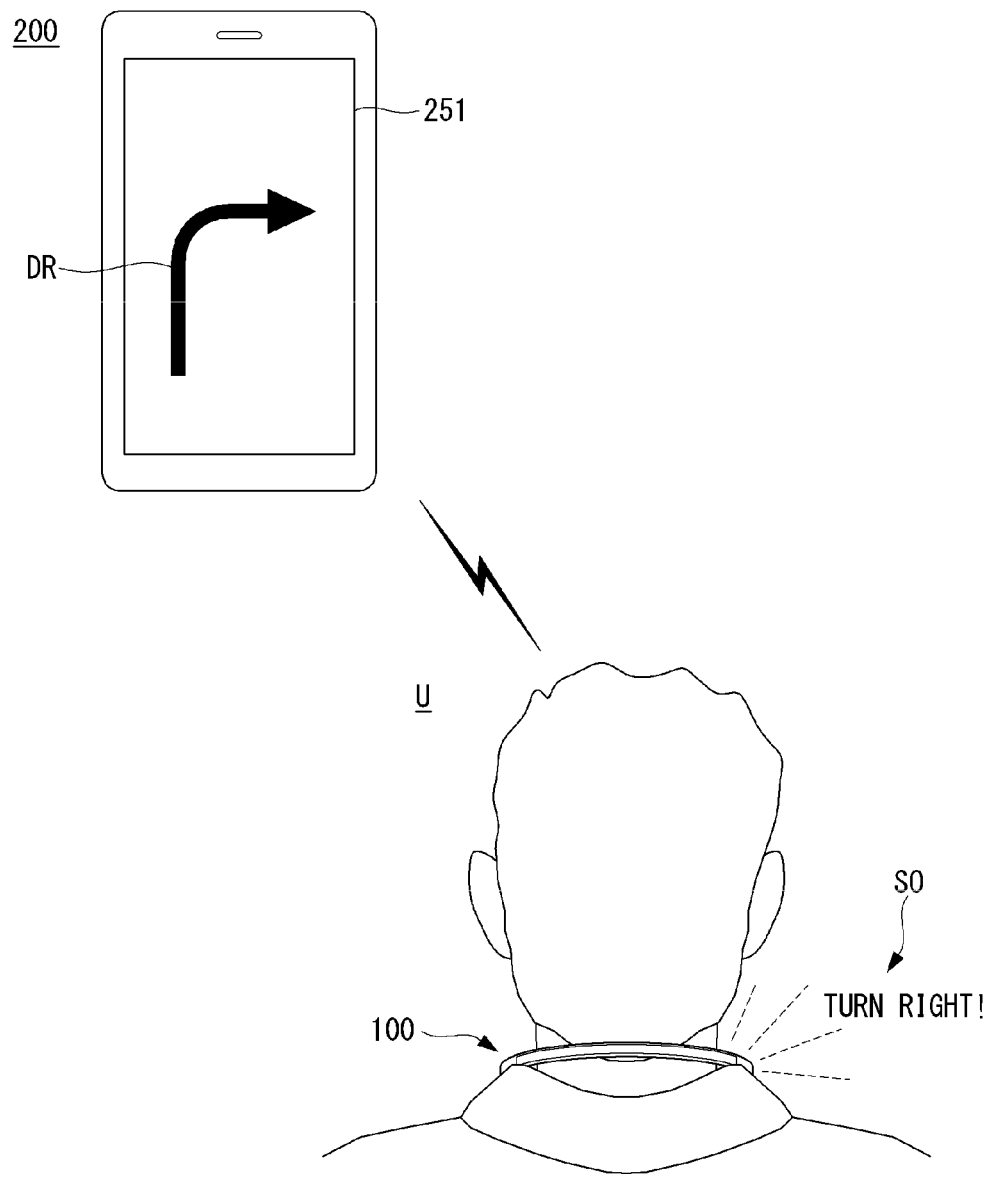

Referring to FIG. 26, the mobile terminal 200 carried by the user may perform route guide DR. For example, route guide can be provided through a display 251 of the mobile terminal 200.

The mobile terminal 200 can transmit information to the electronic device 100. For example, the mobile terminal 200 can route guide data to the electronic device 100. The electronic device 100 can provide route guide to the user U using the received route guide data.

The electronic device 100 can perform operation optimized for the state of the electronic device 100. For example, when the user U wears the electronic device 100 around the neck, route guide can be provided to the user using a sound output through the speaker. Accordingly, the user can be provided with accurate guide through a sound without watching the display 251 of the mobile terminal 200.

Referring to FIG. 27, the user U may change the mode of the mobile terminal 200 using the electronic device 100 operating in connection with the mobile terminal 200.

Referring to FIG. 27(a), the mobile terminal 200 may be in a route guide mode. The user U can operate the mobile terminal 200 using the electronic device 100 worn by the user. For example, the user U can make instruction of "map mode" through a voice. The electronic device 100 can transmit the voice instruction of the user to the mobile terminal 200.

Referring to FIG. 27(b), the mobile terminal 200 can change the operation mode upon reception of the instruction of the user U using the electronic device 100. For example, the route guide mode can be switched to a map mode.

Figure 28:
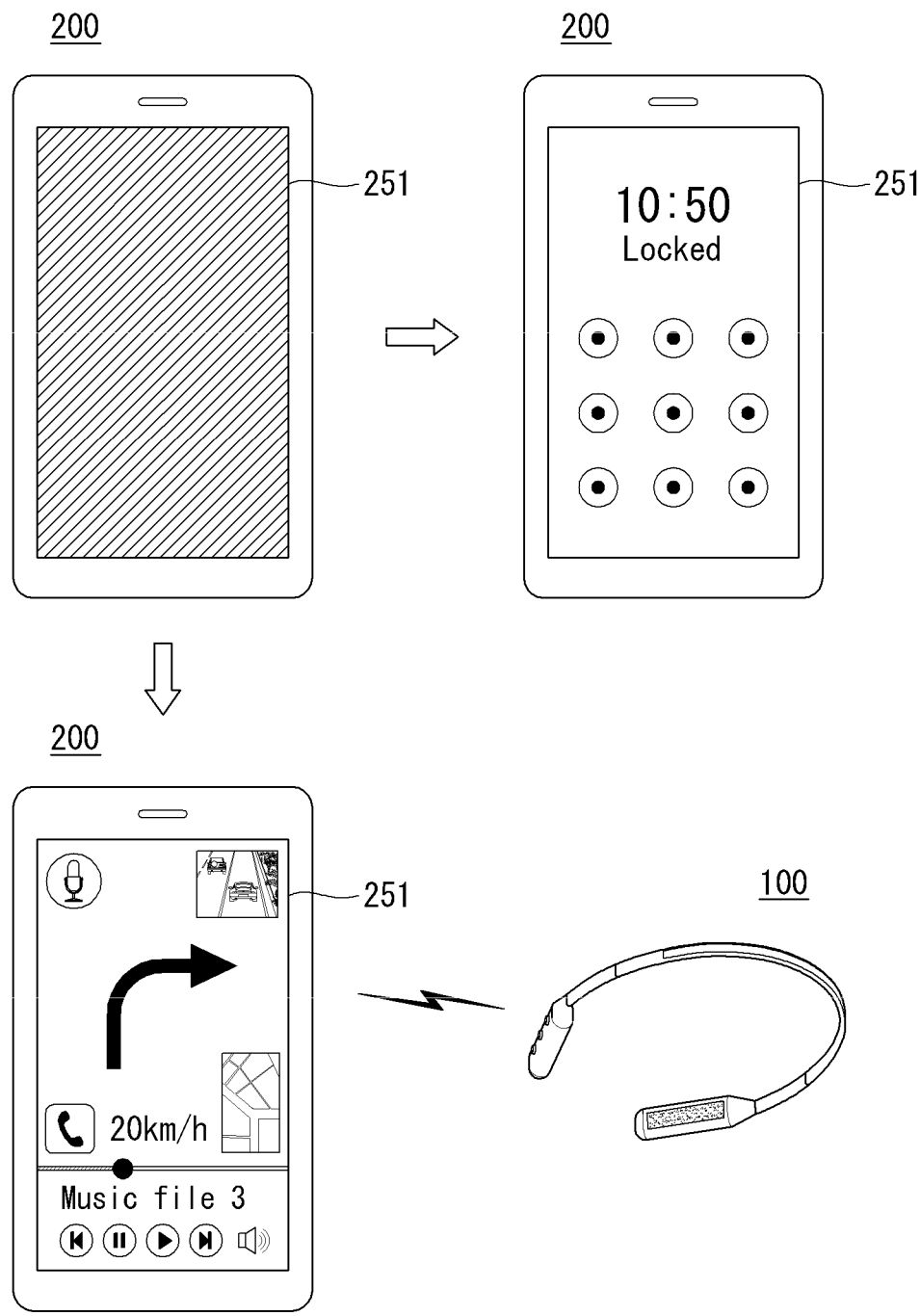

Referring to FIG. 28, when the mobile terminal 200 operates in connection with the electronic device 100, operation of the mobile terminal 200 may be changed.

Referring to FIG. 28(a), the mobile terminal 200 may be in a deactivated state. For example, the display 251 of the mobile terminal is turned off as the mobile terminal 200 is not used for a predetermined time or longer.

Referring to FIG. 28(b), when the user operates the mobile terminal 200 in the deactivated state, the mobile terminal 200 may be switched to a lock state. Accordingly, the user needs to release the lock state of the mobile terminal 200 by inputting a password or the like.

Referring to FIG. 28(c), when the mobile terminal 200 operates in connection with the electronic device 100, a procedure for unlocking the mobile terminal 200 may not be necessary even if the mobile terminal 200 is in the deactivated state. For example, the deactivated mobile terminal 200 can be activated and, simultaneously, necessary information can be displayed on the mobile terminal 200. That is, when the mobile terminal 200 operates in the route guide mode in connection with the electronic device 100, is deactivated and then activated again, the mobile terminal 200 can directly enter the route guide state instead of the lock state.

Figure 29:
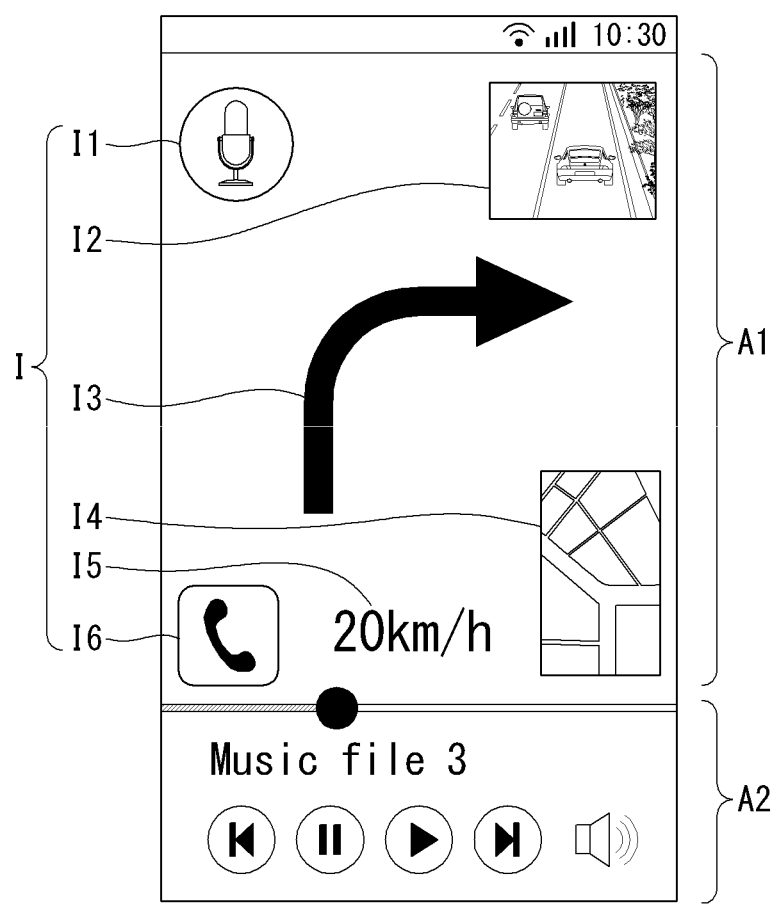

Referring to FIG. 29, the display 251 of the mobile terminal 200 operating in connection with the electronic device 100 may display information necessary for the user who wears the electronic device 100. In this case, the display of the mobile terminal 200, which is wider than that of the electronic device 100, can be used.

The display 251 may include a first area A1 and a second area A2. The first area A1 may be a route guide area and the second area A2 may be a player area.

The user can operate a music play state without additional manipulation through the second area A2. Accordingly, the user can easily listen to music in the bicycle mode through such screen layout.

The user can acquire and/or process necessary information through the first area A1. For example, the first area A1 may display at least one of a voice activation region I1 through which acquisition of a voice command of the use can be activated, an image region I2 displaying an image which is being photographed by the camera of the mobile terminal 100, a route guide region I3, a map region I4, a current velocity region I5, a call region I6 through which a calling function can be activated. The user can acquire information or execute necessary functions through the regions.

Referring to FIG. 30, the electronic device 100 can acquire information from the mobile terminal 200 and output the information. For example, when riding a bicycle is finished, the riding route can be displayed on the display 251 of the mobile terminal 200. The electronic device 100 can provide information acquired from the mobile terminal 200 through a voice. Accordingly, the user can recognize the information without watching the display 251 of the mobile terminal 200.

FIGS. 31 and 32 illustrate communication methods of the electronic device shown in FIG. 1.

As shown, the electronic device 100 according to an embodiment of the present invention can transmit and receive data through various methods.

Referring to FIG. 31, the electronic device 100 can transmit and receive data through the mobile terminal 200. That is, the electronic device 100 can be subordinate to the mobile terminal 200 to communicate with an access point (AP) through the mobile terminal 200. The electronic device can be linked with the mobile terminal 200 through Bluetooth, Wi-Fi and the like.

Referring to FIG. 32(a), the electronic device 100 can directly communicate with the AP. That is, the electronic device 100 serves as a main device and the mobile terminal 200 can transmit and receive data through the electronic device 100. This operation can be performed when a USIM is provided in the electronic device 100.

Referring to FIG. 32(b), the electronic device 100 can independently communicate with the AP irrespective of mobile terminal 200. That is, the electronic device 100 can independently operate while directly acquiring necessary data from the AP.

The electronic device 100 can acquire a warning signal from the other device 200. For example, when the user has a rapid pulse or needs rest due to excessive exercise, the controller 180 of the electronic device can send a warning signal to the user through vibration, sound and the like.

The above-described present invention may be implemented using a computer-readable medium having instructions stored thereon. The computer readable recording medium may be any data storage device that can store data that can be thereafter read by a computer system. Examples of possible computer-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the computer-readable medium may be realized in the form of a carrier wave (for example, a transmission over the Internet). The computer may include the controller 180 of the terminal. As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. An electronic device, comprising:
a first body having an arch shape corresponding to the neck of a user;
a second body attached to a first end of the first body by a first joint, wherein the second body pivots with respect to the first body via the first joint, the second body including a proximal portion connected to the first end of the first body by the first joint and a distal portion connected to the proximal portion by a second joint;
a directional speaker provided on the distal portion of the second body, wherein the distal portion pivots and rotates relative to the proximal portion of the second body via the second joint, and
a third body attached to a second end of the first body, wherein operation of the directional speaker changes according to an operation mode of the electronic device, and
wherein the operation mode of the electronic device includes at least one of:
a first mode for changing the operation of a display provided on the first body by sensing at least one of a velocity change and an acceleration change of the electronic device;

a second mode for changing the operation of at least one or more vibration units and the directional speaker by sensing an object approaching the electronic device;

a third mode for changing the operation of the one or more vibration units and the directional speaker depending on acquired route information;

a fourth mode for changing the operation of the directional speaker when adjacent to an activated microphone; and a fifth mode for changing the operation of the directional speaker depending on the position of the first and second bodies relative to each other.

2. The electronic device of claim 1, further comprising:
a microphone provided at one of the second body and the third body; and
a controller that adjusts the volume of the directional speaker as a function of the location of the directional speaker relative to the or deactivates the directional speaker when the microphone is activated.

3. The electronic device of claim 1 further comprising a controller that selectively deactivates directivity of the directional speaker depending on an operation mode of the electronic device.

4. The electronic device of claim 1, wherein the first body includes a display that emits light.

5. The electronic device of claim 4, wherein the display is divided into a first area and a second area, and wherein the first and second areas independently operate.

6. The electronic device of claim 5, further comprising:
a sensor that acquires at least one of a velocity and an acceleration of the electronic device; and
a controller that controls the first area of the display to be activated or to flicker or to be brighter than the second area of the display when the sensor acquires an acceleration of the electronic device in a first direction, and controls the second area of the display to be activated or to flicker or to be brighter than the first area of the display when the sensor acquires an acceleration of the electronic device in a second direction.

7. The electronic device of claim 1, further comprising:
a sensor that acquires an acceleration of the electronic device;
a first vibration unit provided on the second body;
a second vibration unit provided on the third body; and
a controller that controls the first vibration unit to vibrate when the acquired acceleration is in the direction of the second body, and controls the second vibration unit to vibrate when the acquired acceleration is in the direction of the third body.

8. The electronic device of claim 1, further comprising:
a wireless communication unit that acquires direction information from another device;
a first vibration unit provided on the third body;
a second vibration unit provided the second body; and
a controller that controls the first vibration unit to vibrate when the acquired direction information indicates a direction towards the third body, and controls the second vibration unit to vibrate when the acquired direction information indicates a direction towards the second body.

9. The electronic device of claim 1, wherein the second joint includes a first hinge by which the distal portion of the second body pivots with respect to the proximal portion of the second body, and a second hinge by which the distal portion of the second body rotates with respect to the proximal portion of the second body.

10. The electronic device of claim 9, wherein the first joint is provided between the first and second bodies.

11. A method for controlling the electronic device of claim 1, comprising:
setting an operation mode of the electronic device; and
changing the operation of the electronic device including operation of the directional speaker according to the set operation mode.

* * * * *